United States Patent
Yang et al.

(10) Patent No.: US 12,538,227 B2
(45) Date of Patent: Jan. 27, 2026

(54) SIGNAL SENDING METHOD AND APPARATUS, SIGNAL RECEIVING METHOD AND APPARATUS, AND STORAGE MEDIUM

(71) Applicant: DATANG MOBILE COMMUNICATIONS EQUIPMENT CO., LTD., Beijing (CN)

(72) Inventors: Meiying Yang, Beijing (CN); Jiaqing Wang, Beijing (CN); Chen Luo, Beijing (CN); Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 569 days.

(21) Appl. No.: 17/922,379

(22) PCT Filed: Apr. 29, 2021

(86) PCT No.: PCT/CN2021/091021
§ 371 (c)(1),
(2) Date: Oct. 31, 2022

(87) PCT Pub. No.: WO2021/219084
PCT Pub. Date: Nov. 4, 2021

(65) Prior Publication Data
US 2023/0217369 A1 Jul. 6, 2023

(30) Foreign Application Priority Data
Apr. 30, 2020 (CN) .......................... 202010368097.7

(51) Int. Cl.
*H04W 52/02* (2009.01)
*H04L 5/00* (2006.01)
(Continued)

(52) U.S. Cl.
CPC ....... *H04W 52/0225* (2013.01); *H04L 5/0053* (2013.01); *H04W 52/287* (2013.01); *H04W 72/232* (2023.01)

(58) Field of Classification Search
CPC ........... H04W 52/0225; H04W 52/287; H04W 72/232; H04W 72/56; H04W 72/23;
(Continued)

(56) References Cited

U.S. PATENT DOCUMENTS 4,878,051 A 10/1989 Andros et al.
10,631,138 B2 4/2020 Chae et al.
(Continued)

FOREIGN PATENT DOCUMENTS

CN 101640574 A 2/2010
CN 102170641 A 8/2011
(Continued)

OTHER PUBLICATIONS

European Patent Office, Extended European Search Report Issued in Application No. 21796560.7, Mar. 25, 2024, Germany, 13 pages.
(Continued)

*Primary Examiner* — Nimesh Patel
(74) *Attorney, Agent, or Firm* — KILPATRICK TOWNSEND & STOCKTON LLP

(57) ABSTRACT

A signal sending method and apparatus, a signal receiving method and apparatus, and a storage medium. The method comprises: sending resource configuration information, which includes a first configuration resource and a second configuration resource; sending a first signal on the basis of the resource configuration information, and a first node group and a second node group monitor a first signal on the basis of respectively corresponding configuration resources; generating and sending a second signal, the second signal being sent on a sending resource indicated by the first signal, and the node groups receive the second signal after the first signal is monitored. Nodes are grouped, and respectively corresponding configuration resources are respectively configured for the node groups; the first signal is sent on the basis of the configuration resources, and the first signal carrying the sending resource to instruct the nodes to receive the second signal, to reduce a collision problem in multiple P-RNTI configurations, avoiding invalid paging monitoring
(Continued)

of the nodes, and saving the power consumption of the nodes.

20 Claims, 3 Drawing Sheets

(51) Int. Cl.
 *H04W 52/28* (2009.01)
 *H04W 72/232* (2023.01)
(58) Field of Classification Search
 CPC ...... H04W 4/08; H04L 5/0053; H04L 5/0037; Y02D 30/70
 See application file for complete search history.

(56) References Cited

U.S. PATENT DOCUMENTS

| 2008/0144525 | A1* | 6/2008 | Crockett | H04W 12/08 370/254 |
| 2013/0107848 | A1* | 5/2013 | Kang | H04B 7/026 370/329 |
| 2015/0257151 | A1* | 9/2015 | Lin | H04W 72/30 370/259 |
| 2015/0351080 | A1* | 12/2015 | Zhou | H04W 76/30 455/422.1 |
| 2016/0150390 | A1* | 5/2016 | Chen | H04W 8/24 370/328 |
| 2016/0286374 | A1* | 9/2016 | Baghel | H04W 24/10 |
| 2016/0301511 | A1* | 10/2016 | Yoon | H04B 7/0413 |
| 2019/0044597 | A1* | 2/2019 | Tamrakar | H04B 7/0626 |
| 2019/0239035 | A1* | 8/2019 | Chae | H04W 52/283 |
| 2020/0029318 | A1* | 1/2020 | Guo | H04L 1/1854 |
| 2020/0187170 | A1* | 6/2020 | Shin | H04L 27/2666 |

FOREIGN PATENT DOCUMENTS

| CN | 110072285 A | 7/2019 |
| EP | 3537822 A1 | 9/2019 |
| WO | 9305622 A1 | 3/1993 |
| WO | 2020024271 A1 | 2/2020 |

OTHER PUBLICATIONS

ZTE, "Report of email discussion [107#57][NB-IoT/eMTC R16] WUS Configuration", 3GPP TSG-RAN2 Meeting #107bis, Chongqing, China, Oct. 14-18, 2019, total 38 pages, R2-1913831.

* cited by examiner

SIGNAL SENDING METHOD AND APPARATUS, SIGNAL RECEIVING METHOD AND APPARATUS, AND STORAGE MEDIUM

CROSS-REFERENCE TO RELATED APPLICATION

The present application is a US National Stage of International Application No. PCT/CN2021/091021, filed on Apr. 29, 2021, which claims priority to Chinese application No. 202010368097.7 filed on Apr. 30, 2020, entitled "Signal Sending Method and Apparatus, Signal Receiving Method and Apparatus, and Storage Medium", which are hereby incorporated by reference in their entireties.

FIELD

The present application relates to the field of wireless communication, and in particular, to a method and an apparatus for transmitting signals, a method and an apparatus for receiving signals, and a storage medium.

BACKGROUND

A study on power saving scheme under radio resource control idle (RRC-idle) state is proposed in user equipment (UE) power saving topics of new radio (NR) R17 work item. The study mainly is to reduce physical downlink control channel (PDCCH) monitoring for paging.

Up to now, in the NR R16 standard, the monitoring for paging under RRC-Idle/RRC-Inactive state is defined. UE calculates a paging frame (PF) and a paging occasion (PO) according to parameter configuration. At PO moment, UE monitors a downlink control indicator (DCI) scrambled by a paging-radio network temporary identifier (P-RNTI) in a search space (SS), demodulates and decodes DCI to obtain a physical downlink shared channel (PDSCH) carrying a paging message, demodulates and decodes PDSCH to obtain a UE list for recording that UE has transmitted a paging message, and then queries the list and obtains the paging message carried by the PDSCH if UE exists in the list, otherwise, the UE does not obtain the paging message.

PDCCH monitoring for paging is scrambled by P-RNTI. P-RNTI is shared by all UEs. The base station configures monitoring periods, the number of paging radio frames in each period, and the number of POs in each paging radio frame. At the same PO moment, multiple UEs may be required to monitor paging. As long as one UE has a paging message, the base station will transmit DCI scrambled by P-RNTI at the PO moment for transmitting paging for UE. However, other UEs at the PO moment, regardless of whether they have their own paging, are required to wake up to monitor DCI scrambled by P-RNTI. Once DCI scrambled by P-RNTI is monitored, UEs perform subsequent operations including demodulating and decoding PDCCH and PDSCH until UEs find that they are absent in UE list for recording that UE has transmitted a paging message, which results in unnecessary power consumption for UE.

To solve the above problems, a direct way in the related art is to extend one P-RNTI to multiple P-RNTIs (MP-RNTI). In particular, if each UE is configured with one P-RNTI, each UE monitors its own P-RNTI, and if its own P-RNTI is monitored, the UE demodulates and decodes PDCCH and PDSCH, otherwise, the UE neither demodulate and decode PDCCH and PDSCH and nor obtain the paging message, which reduces ineffective monitoring for paging and the power consumption for UE.

However, a problem of collision between DCIs carrying multiple P-RNTIs will occur when the P-RNTI is configured as multiple P-RNTIs, namely MP-RNTI, since the control resource set (CORESET) of paging can be configured as CORESET #0 and non-CORESET #0.

SUMMARY

In view of the problem above, embodiments of the present application provide a method and an apparatus for transmitting signals, a method and an apparatus for receiving signals, and a storage medium.

According to an embodiment of the present application provides a method for transmitting signals, including:
  transmitting resource configuration information, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;
  generating a first signal and transmitting the first signal based on the resource configuration information for the first node group and the second node group monitoring the first signal based on respective corresponding configuration resources, and
  generating a second signal and transmitting the second signal on a transmission resource indicated by the first signal for the first node group and the second node group receiving the second signal based on the transmission resource indicated by the first signal after the first signal is monitored.

In an embodiment, the first configuration resource includes a first parameter configuration in a first resource set, and the second configuration resource includes a second parameter configuration in the first resource set.

The generating a first signal and transmitting the first signal based on the resource configuration information for the first node group and the second node group monitoring the first signal based on respective configuration resources includes:
  generating and transmitting the first signal, where the first signal is transmitted based on the first resource set for the first node group monitoring the first signal based on the first parameter configuration, and for the second node group monitoring the first signal based on the second parameter configuration or for the second node group monitoring the first signal based on a combination of the first parameter configuration and the second parameter configuration. The first resource set is the resource configuration information.

In an embodiment, the first configuration resource includes a third parameter configuration in a second resource set, and the second configuration resource includes a fourth parameter configuration in a third resource set; the first signal includes a third signal and/or a fourth signal;
  generating a first signal and transmitting the first signal based on the resource configuration information for the first node group and the second node group monitoring the first signal based on respective configuration resources includes:
  generating and transmitting the third signal, where the third signal is transmitted based on the third parameter configuration in the second resource set for the first node group and/or the second node group monitoring the third signal based on the third parameter configuration, the third parameter configuration in the second resource set being the resource configuration information; and/or generating and transmitting the fourth signal, where the fourth signal is transmitted based on the fourth parameter configuration in the third resource set for the second node group monitoring the fourth signal based on the fourth parameter configuration, the fourth parameter configuration in the third resource set being the resource configuration information.

In an embodiment, the second configuration resource further includes a fifth parameter configuration in the second resource set, and the method further includes:

transmitting the fourth signal based on the fifth parameter configuration in the second resource set for the second node group monitoring the fourth signal based on the fifth parameter configuration; and the fifth parameter configuration in the second resource set is the resource configuration information.

In an embodiment, the second signal includes a fifth signal and/or a sixth signal; and the generating a second signal and transmitting the second signal on a transmission resource indicated by the first signal for the first node group and the second node group receiving the second signal based on the transmission resource indicated by the first signal after the first signal is monitored includes:

generating and transmitting the fifth signal, where the fifth signal is transmitted on a transmission resource indicated by the third signal for the first node group and/or the second node group receiving the fifth signal based on the transmission resource indicated by the third signal after the third signal is monitored; and/or generating and transmitting the sixth signal, where the sixth signal is transmitted on a transmission resource indicated by the fourth signal for the second node group receiving the sixth signal based on the transmission resource indicated by the fourth signal after the fourth signal is monitored.

In an embodiment, each of the first configuration resource and the second configuration resource includes at least one of: time-frequency resource configuration, aggregation level (AL), numbers of blind decoding, candidates, or search space configuration; where the search space configuration includes at least one of a search space period, a search space offset, or a symbol pattern for each physical downlink control channel (PDCCH) monitoring occasion.

In an embodiment, each of the first resource set, the second resource set and the third resource set includes at least one of: one or more slots, one or more symbols, one or more control resource sets (CORESET), one or more search spaces (SS), or one or more monitoring occasions (MO); and each of the first resource set, the second resource set and the third resource set is configured and/or transmitted through at least one of predefining, broadcast messages, system messages, or radio resource control (RRC) signaling/messages.

In an embodiment, the search space of the first resource set and the search space of the second resource set include a common search space; and the search space of the third resource set includes at least one of a common search space or a node-specific search space.

In an embodiment, according to the method of the present application, each of the first configuration resource and the second configuration resource is configured with a corresponding monitoring priority to indicate whether to monitor and/or a monitoring order;

one of the first configuration resource and the second configuration resource is configured with a monitoring priority to indicate whether to monitor and/or a monitoring order;

each of the first node group and the second node group is configured with a corresponding monitoring priority to indicate whether to monitor and/or a monitoring order; and/or one of the first node group and the second node group is configured with a corresponding monitoring priority to indicate whether to monitor and/or a monitoring order.

In an embodiment, each of the first configuration resource and the second configuration resource is configured with the corresponding monitoring priority, which includes any one or any combination of:

each resource set being configured with a corresponding monitoring priority;

one or more of all resource sets being configured with a monitoring priority to indicate whether to monitor and/or a monitoring order;

each parameter configuration being configured with a corresponding monitoring priority; or one or more of the parameter configuration being configured with a monitoring priority to indicate whether to monitor and/or a monitoring order.

In an embodiment, the first node group and the second node group are grouped based on at least one of:

grouping numbers configured by a network, network-predefined rules or information reported by nodes;

where the grouping numbers are configured and/or transmitted through at least one of predefining, broadcast messages, system messages, or radio resource control (RRC) signaling/messages.

According to an embodiment of the present application provides a method for receiving signals, including:

receiving, based on a determined grouping number of a node group, one or more configuration resources of resource configuration information transmitted by a network side, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;

monitoring a first signal based on a corresponding configuration resource, where the first signal is transmitted by the network side based on the resource configuration information; and receiving a second signal based on a transmission resource indicated by the first signal after the first signal is monitored, where the second signal is transmitted by the network side on the transmission resource indicated by the first signal.

In an embodiment, the first configuration resource includes a first parameter configuration in a first resource set, and the second configuration resource includes a second parameter configuration in the first resource set;

the monitoring the first signal based on the corresponding configuration resource, where the first signal is transmitted by the network side based on the resource configuration information, includes:

monitoring, by the first node group, the first signal based on the first parameter configuration, and monitoring, by the second node group, the first signal based on the second parameter configuration, or monitoring, by the second node group, the first signal based on a combination of the first parameter configuration and the second parameter configuration.

In an embodiment, the first configuration resource includes a third parameter configuration in a second resource set, and the second configuration resource includes a fourth parameter configuration in a third resource set, and the first signal includes a third signal and/or a fourth signal.

The monitoring the first signal based on the corresponding configuration resource, includes:
monitoring, by the first node group and/or the second node group, the third signal based on the third parameter configuration in the second resource set; and/or
monitoring, by the second node group, the fourth signal based on the fourth parameter configuration in the third resource set.

In an embodiment, the second configuration resource further includes a fifth parameter configuration in the second resource set, and the method further includes:
monitoring, by the second node group, the fourth signal based on the fifth parameter configuration.

In an embodiment, the second signal includes a fifth signal and/or a sixth signal, the receiving the second signal based on the transmission resource indicated by the first signal after the first signal is monitored, where the second signal is transmitted by the network side on the transmission resource indicated by the first signal, includes:
receiving, by the first node group and/or the second node group, the fifth signal based on a transmission resource indicated by the third signal after the third signal is monitored; and/or
receiving, by the second node group, the sixth signal based on a transmission resource indicated by the fourth signal after the fourth signal is monitored.

In an embodiment, each of the first configuration resource and the second configuration resource includes at least one of: time-frequency resource configuration, aggregation level (AL), numbers of blind decoding, candidates, or search space configuration; where the search space configuration includes at least one of a search space period, a search space offset, or a symbol pattern for each physical downlink control channel (PDCCH) monitoring occasion.

In an embodiment, each of the first resource set, the second resource set and the third resource set includes at least one of: one or more slots, one or more symbols, one or more control resource sets (CORESET), one or more search spaces (SS), or one or more monitoring occasions (MO); and
each of the first resource set, the second resource set and the third resource set is configured and/or received through at least one of predefining, broadcast messages, system messages, or radio resource control (RRC) signaling/messages.

In an embodiment, the search space of the first resource set and the search space of the second resource set include a common search space.

The search space of the third resource set includes at least one of a common search space or a node-specific search space.

In an embodiment, according to the method of the present application,
each of the first configuration resource and the second configuration resource is configured with a corresponding monitoring priority to indicate whether to monitor and/or a monitoring order,
one of the first configuration resource and the second configuration resource is configured with a monitoring priority to indicate whether to monitor and/or a monitoring order,
each of the first node group and the second node group is configured with a corresponding monitoring priority to indicate whether to monitor and/or a monitoring order, and/or
one of the first node group and the second node group is configured with a corresponding monitoring priority to indicate whether to monitor and/or a monitoring order, and
the method further includes:
monitoring or sequentially monitoring, by first node group and the second node group, according to configured monitoring priorities.

In an embodiment, each of the first configuration resource and the second configuration resource is configured with the corresponding monitoring priority, which includes any one or any combination of:
each resource set being configured with a corresponding monitoring priority;
one or more of all resource sets being configured with a monitoring priority to indicate whether to monitor and/or a monitoring order;
each parameter configuration being configured with a corresponding monitoring priority; or
one or more of the parameter configuration being configured with a monitoring priority to indicate whether to monitor and/or a monitoring order.

In an embodiment, the first node group and the second node group are grouped based on grouping numbers configured by a network, network-predefined rules or information reported by nodes;
where the grouping numbers are configured and/or received through at least one of predefining, broadcast messages, system messages, or radio resource control (RRC) signaling/messages.

According to an embodiment of the present application provides an apparatus for transmitting signals, including:
a configuring device, used to transmit resource configuration information, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;
a first processing device used to generate a first signal and transmit the first signal based on the resource configuration information for the first node group and the second node group monitoring the first signal based on respective configuration resources, and
a second processing device used to generate a second signal and transmit the second signal on a transmission resource indicated by the first signal for the first node group and the second node group receiving the second signal based on the transmission resource indicated by the first signal after the first signal is monitored.

According to an embodiment of the present application provides a network side apparatus, including a processor and a memory storing a program that is executable on the processor, the program, when executed by the processor, causes the processor to perform the following steps:

transmitting resource configuration information, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;

generating a first signal and transmitting the first signal based on the resource configuration information for the first node group and the second node group monitoring the first signal based on respective configuration resources, and generating a second signal and transmitting the second signal on a transmission resource indicated by the first signal for the first node group and the second node group receiving the second signal based on the transmission resource indicated by the first signal after the first signal is monitored.

In an embodiment, the first configuration resource includes a first parameter configuration in a first resource set, and the second configuration resource includes a second parameter configuration in the first resource set.

The generating a first signal and transmitting the first signal based on the resource configuration information for the first node group and the second node group monitoring the first signal based on respective configuration resources includes:

generating and transmitting the first signal, where the first signal is transmitted based on the first resource set for the first node group monitoring the first signal based on the first parameter configuration, and for the second node group monitoring the first signal based on the second parameter configuration or for the second node group monitoring the first signal based on a combination of the first parameter configuration and the second parameter configuration, where the first resource set is the resource configuration information.

In an embodiment, the first configuration resource includes a third parameter configuration in a second resource set, and the second configuration resource includes a fourth parameter configuration in a third resource set; the first signal includes a third signal and/or a fourth signal;

the generating a first signal and transmitting the first signal based on the resource configuration information for the first node group and the second node group monitoring the first signal based on respective configuration resources includes:

generating and transmitting the third signal, where the third signal is transmitted based on the third parameter configuration in the second resource set for the first node group and/or the second node group monitoring the third signal based on the third parameter configuration, the third parameter configuration in the second resource set being the resource configuration information; and/or generating and transmitting the fourth signal, where the fourth signal is transmitted based on the fourth parameter configuration in the third resource set for the second node group monitoring the fourth signal based on the fourth parameter configuration, the fourth parameter configuration in the third resource set being the resource configuration information.

In an embodiment, the second configuration resource further includes a fifth parameter configuration in the second resource set, and the steps further include:

transmitting the fourth signal based on the fifth parameter configuration in the second resource set for the second node group monitoring the fourth signal based on the fifth parameter configuration; where the fifth parameter configuration in the second resource set is the resource configuration information.

In an embodiment, the second signal includes a fifth signal and/or a sixth signal, and the generating a second signal and transmitting the second signal on a transmission resource indicated by the first signal for the first node group and the second node group receiving the second signal based on the transmission resource indicated by the first signal after the first signal is monitored includes:

generating and transmitting the fifth signal, where the fifth signal is transmitted on a transmission resource indicated by the third signal for the first node group and/or the second node group receiving the fifth signal based on the transmission resource indicated by the third signal after the third signal is monitored; and/or generating and transmitting the sixth signal, where the sixth signal is transmitted on a transmission resource indicated by the fourth signal for the second node group receiving the sixth signal based on the transmission resource indicated by the fourth signal after the fourth signal is monitored.

In an embodiment, each of the first configuration resource and the second configuration resource include at least one of: time-frequency resource configuration, aggregation level (AL), numbers of blind decoding, candidates, or search space configuration; where the search space configuration includes at least one of a search space period, a search space offset, or a symbol pattern for each physical downlink control channel (PDCCH) monitoring occasion.

In an embodiment, each of the first resource set, the second resource set and the third resource set includes at least one of: one or more slots, one or more symbols, one or more control resource sets (CORESET), one or more search spaces (SS), or one or more monitoring occasions (MO); and each of the first resource set, the second resource set and the third resource set is configured and/or transmitted through at least one of predefining, broadcast messages, system messages, or radio resource control (RRC) signaling/messages.

In an embodiment, the search space of the first resource set and the search space of the second resource set include a common search space; and a search space of the third resource set includes at least one of a common search space or a node-specific search space.

In an embodiment, according to the network side apparatus of the present application, each of the first configuration resource and the second configuration resource is configured with a corresponding monitoring priority to indicate whether to monitor and/or a monitoring order;

one of the first configuration resource and the second configuration resource is configured with a monitoring priority to indicate whether to monitor and/or a monitoring order;

each of the first node group and the second node group is configured with a corresponding monitoring priority to indicate whether to monitor and/or a monitoring order; or one of the first node group and the second node group is configured with a corresponding monitoring priority to indicate whether to monitor and/or a monitoring order.

In an embodiment, each of the first configuration resource and the second configuration resource is configured with the corresponding monitoring priority, which includes any one or any combination of:
  each resource set being configured with a corresponding monitoring priority;
  one or more of all resource sets being configured with a monitoring priority to indicate whether to monitor and/or a monitoring order;
  each parameter configuration being configured with a corresponding monitoring priority; or
  one or more of the parameter configuration being configured with a monitoring priority to indicate whether to monitor and/or a monitoring order.

In an embodiment, the first node group and the second node group are grouped based on at least one of:
  grouping numbers configured by a network, network-predefined rules or information reported by nodes, where the grouping numbers are configured and/or transmitted through at least one of predefining, broadcast messages, system messages, or radio resource control (RRC) signaling/messages.

According to an embodiment of the present application provides an apparatus for receiving signals, including:
  a receiving device used to receive, based on a determined grouping number of a node group, one or more configuration resources of resource configuration information transmitted by a network side, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;
  a first monitoring device used to monitor a first signal based on a corresponding configuration resource, where the first signal is transmitted by the network side based on the resource configuration information; and
  a second monitoring device used to receive a second signal based on a transmission resource indicated by the first signal after the first signal is monitored, where the second signal is transmitted by the network side on the transmission resource indicated by the first signal.

According to an embodiment of the present application provides a node apparatus, including a processor and a memory storing a program that is executable on the processor, the program, when executed by the processor, causes the processor to perform the following steps:
  receiving, based on a determined grouping number of a node group, one or more configuration resources of resource configuration information transmitted by a network side, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;
  monitoring a first signal based on a corresponding configuration resource, where the first signal is transmitted by the network side based on the resource configuration information; and
  receiving a second signal based on a transmission resource indicated by the first signal after the first signal is monitored, where the second signal is transmitted by the network side on the transmission resource indicated by the first signal.

In an embodiment, the first configuration resource includes a first parameter configuration in a first resource set, and the second configuration resource includes a second parameter configuration in the first resource set;
  the monitoring the first signal based on the corresponding configuration resource, where the first signal is transmitted by the network side based on the resource configuration information, includes:
  monitoring, by the first node group, the first signal based on the first parameter configuration, and monitoring, by the second node group, the first signal based on the second parameter configuration, or monitoring, by the second node group, the first signal based on a combination of the first parameter configuration and the second parameter configuration.

In an embodiment, the first configuration resource includes a third parameter configuration in a second resource set, and the second configuration resource includes a fourth parameter configuration in a third resource set, and the first signal includes a third signal and/or a fourth signal.

The monitoring the first signal based on the corresponding configuration resource, includes:
  monitoring, by the first node group and/or the second node group, the third signal based on the third parameter configuration in the second resource set; and/or
  monitoring, by the second node group, the fourth signal based on the fourth parameter configuration in the third resource set.

In an embodiment, the second configuration resource further includes a fifth parameter configuration in the second resource set, and the steps further include:
  monitoring, by the second node group, the fourth signal based on the fifth parameter configuration In an embodiment, the second signal includes a fifth signal and/or a sixth signal, the receiving the second signal based on the transmission resource indicated by the first signal after the first signal is monitored, where the second signal is transmitted by the network side on the transmission resource indicated by the first signal, includes:
  receiving, by the first node group and/or the second node group, the fifth signal based on a transmission resource indicated by the third signal after the third signal is monitored; and/or receiving, by the second node group, the sixth signal based on a transmission resource indicated by the fourth signal after the fourth signal is monitored.

In an embodiment, each of the first configuration resource and the second configuration resource includes at least one of: time-frequency resource configuration, aggregation level (AL), numbers of blind decoding, candidates, or search space configuration; where the search space configuration includes at least one of a search space period, a search space offset, or a symbol pattern for each physical downlink control channel (PDCCH) monitoring occasion.

In an embodiment, each of the first resource set, the second resource set and the third resource set includes at least one of: one or more slots, one or more symbols, one or more control resource sets (CORESET), one or more search spaces (SS), or one or more monitoring occasions (MO); and
  each of the first resource set, the second resource set and the third resource set is configured and/or received through at least one of predefining, broadcast messages, system messages, or radio resource control (RRC) signaling/messages.

In an embodiment, the search space of the first resource set and the search space of the second resource set include a common search space; and the search space of the third resource set includes at least one of a common search space or a node-specific search space.

In an embodiment, any one or any combination of the followings is included:

each of the first configuration resource and the second configuration resource is configured with a corresponding monitoring priority to indicate whether to monitor and/or a monitoring order;

one of the first configuration resource and the second configuration resource is configured with a monitoring priority to indicate whether to monitor and/or a monitoring order;

each of the first node group and the second node group is configured with a corresponding monitoring priority to indicate whether to monitor and/or a monitoring order; or one of the first node group and the second node group is configured with a corresponding monitoring priority to indicate whether to monitor and/or a monitoring order.

The steps further include:

monitoring or sequentially monitoring, by first node group and the second node group, according to configured monitoring priorities.

In an embodiment, each of the first configuration resource and the second configuration resource is configured with the corresponding monitoring priority, which includes any one or any combination of:

each resource set being configured with a corresponding monitoring priority;

one or more of all resource sets being configured with a monitoring priority to indicate whether to monitor and/or a monitoring order;

each parameter configuration being configured with a corresponding monitoring priority; or one or more of the parameter configuration being configured with a monitoring priority to indicate whether to monitor and/or a monitoring order.

In an embodiment, the first node group and the second node group are grouped based on at least one of:

grouping numbers configured by a network, network-predefined rules or information reported by nodes;

where the grouping numbers are configured and/or received through at least one of predefining, broadcast messages, system messages, or radio resource control (RRC) signaling/messages.

In an embodiment of the present application provides a non-transitory computer-readable storage medium storing computer programs that, when executed by a processor, causes to the processor to perform the methods according to the embodiments.

In the method and apparatus for transmitting signals, the method and apparatus for receiving signals, and the storage medium according to embodiments of the present application, by grouping nodes and configuring respective configuration resources for each node group, the first signal is transmitted based on the configuration resources, the first signal carries the transmission resource for indicating each node to monitor and receive the second signal subsequently transmitted by the network side based on the transmission resource, which can reduce collision under multiple P-RNTI configurations, avoid ineffective paging monitoring by the node, and save power consumption of the nodes.

BRIEF DESCRIPTION OF THE DRAWINGS

In order to more clearly illustrate solutions disclosed in the embodiments of the present application or the related art, the drawings used in the descriptions of the embodiments or the related art will be briefly described below. The drawings in the following description are only some embodiments of the present application.

DETAILED DESCRIPTION

Figure 1:
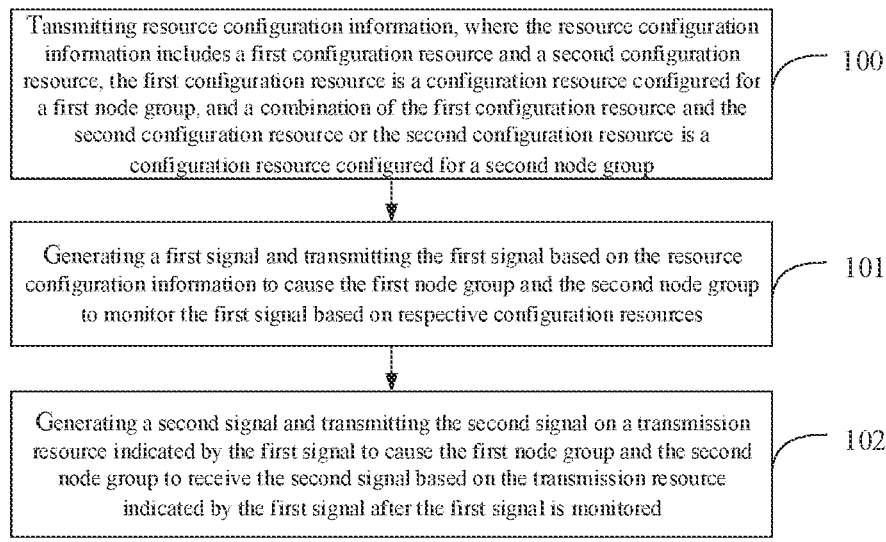
FIG. 1 is a schematic flow chart of a method for transmitting signals according to an embodiment of the present application.

The embodiments of the present application are clearly and completely described in the following with reference to the accompanying drawings in the embodiments of the present application. These embodiments are a part of the embodiments of the present application, and not all of the embodiments.

For clearly describing embodiments of the present application, words such as "first" and "second" in each embodiment of the present application are used to distinguish the same or similar items that have the basically same function and effect and these words such as "first" and "second" do not limit the quantity and execution order.

In view of the problem of unnecessary power consumption for UE, the related art solves the problem by extending one P-RNTI into multiple P-RNTIs (MP-RNTIs). Each UE is configured with one P-RNTI and monitors its own P-RNTI, and if its own P-RNTI is monitored, the UE demodulates and decodes PDCCH and PDSCH, otherwise, the UE does not demodulate and decode PDCCH and PDSCH and does not obtain the paging message, which reduces ineffective monitoring for paging and the power consumption for UE. However, a problem of collision between DCIs carrying multiple P-RNTIs will occur when the P-RNTI is configured as multiple P-RNTIs, namely MP-RNTI, since the CORESET of paging can be configured as CORESET #0 and non-CORESET #0. The specific illustration is as follows.

When the CORESET of paging is configured as CORESET #0:

the CORESET #0 time-frequency resource carries 16 control channel elements (CCE) in 3 OFDM symbols maximally and aggregation levels (AL) can only be configured as (4, 8, 16). The maximum number of the PDCCH candidates that can be supported in TS 38.213

10.0 is (4, 2, 1), that is, the base station can configure up to 4 possible DCI transmissions, however, the maximum number of possible PDCCH candidates that can be monitored for each UE is 7. When multiple P-RNTIs are supported, a problem of a blocking between different P-RNTIs occurs.

When the CORESET of paging is configured as non-CORESET #0:
  the CCE aggregation level and the number of PDCCH candidates are still limited by the searchSpace table of System information block 1 (SIB1): TS 38.213 10.0.

If a UE is not provided pagingSearchSpace for Type2-PDCCH CSS set, the UE does not monitor PDCCH for Type2-PDCCH CSS set on the DL BWP. The CCE aggregation levels and the number of PDCCH candidates per CCE aggregation level for Type2-PDCCH CSS set are given in Table 10.1-1.

That is, the base station can configure up to 4 possible DCI transmissions, however the maximum number of possible PDCCH candidates can be monitored for each UE is 7. When multiple P-RNTIs are supported, a problem of a blocking between different P-RNTIs occurs.

In order to reduce the ineffective paging monitoring, multiple P-RNTIs can be supported. In particular, each UE is configured with one P-RNTI, but a problem of blocking between resources carrying different P-RNTIs occurs. How to reduce or avoid the blocking between resources has become an urgent problem that the industry needs to solve.

In the related art, technology of NR R16 supports multiple UEs to share one P-RNTI, and there is no collision between DCIs carrying different P-RNTIs. Further, in order to support multiple P-RNTIs, more resources can be configured through traditional parameters to avoid collisions. In the NR system, there are two search spaces for the UE to receive paging PDCCH: a displayed paging search space in SIB1 and a search space in a master information block (MIB). The physical layer specifies that the search space configured in SIB1 has priority. If there is no search space configured in SIB1, the UE uses the search space configured in MIB. The search space configured in the MIB is also specified to receive the SIB1 message. The timeline is that UE first monitors and receives the SIB1 message through the search space in the MIB after decoding MIB, and if UE does not find a paging search space in SIB1, it will receive PDCCH for paging message in the search space in which SIB1 is received.

The parameters of the paging search space can be changed, the period of the search space can be decreased, and the number of DCI symbols in the monitoring symbol pattern for DCI configured on each monitoring occasion can be increased. However, the following problems occur.

(1) For the paging search space in the MIB, the search space #0 is configured on CORESET #0, the number of time-frequency resources in the search space #0 is fixed, the combination of all resources is configured as a table, and resource information of search space #0 is configured by indicating an index in the table through a broadcast message. Therefore, there is a problem that the traditional CORESET #0 does not support DCI scrambled by multiple P-RNTIs supported by configuring other configurations of the search space #0.

(2) The paging search space in the SIB1 is configured in non-CORESET #0. A paging search space with a shorter period or symbol pattern carrying PDCCH per slot in the MO with a higher density can be configured by SIB1. Multiple UEs will receive SIB1 since it is a broadcast message. Therefore, for R16 UEs, unnecessary power consumption is increased due to the configuration of paging search space with a shorter period or symbol pattern carrying PDCCH per slot in the MO with a higher density.

To sum up, the traditional NR R16 protocol does not support the configuration of multiple P-RNTIs, so there is no the problem of collision between resources carrying multiple P-RNTIs. In regard to the adjustment of the parameter configuration based on NR R16, for the paging search space in MIB, the traditional CORESET #0 does not support DCI scrambled by multiple P-RNTIs supported by configuring other configurations of the search space #0, and for the paging search space configured in SIB1, there is a problem of increase in power consumption for R16 UE caused by unnecessarily monitoring paging search space. The embodiments of the present application provide a solution to solve the collision between DCI resources carrying multiple P-RNTIs to avoid the above two problems.

FIG. 1 is a schematic flow chart of a method for transmitting signals according to an embodiment of the present application. As shown in FIG. 1, the method includes the following steps.

Step 100, transmitting resource configuration information, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group.

Under RRC-Idle/Inactive state, in order to reduce the power consumption of a node and reduce paging monitoring, the network side provide services for nodes with different version types respectively by configuring a plurality of different configuration resources. In each embodiment of the present application, a node may be at least one of a UE and other devices, and the other devices include at least one of a mechanical device and a vehicle. One or more nodes form a node group. Nodes with different version types are managed in groups. For example, a node group containing R16 nodes can be called the first node group, and a node group containing R17 nodes can be called the second node group. It should be noted that, the foregoing node groups are only used as examples to introduce the solutions of the embodiments of the present application, and the manner of grouping nodes may be set according to actual conditions, and is not limited thereto. It should be noted that the first node group includes at least one node, and the second node group includes at least one node. The network side may include at least one of a base station, a core network, or a powerful node with control function.

In order to solve the problem of collision between DCI resources scrambled by multiple P-RNTIs, the network side configures multiple different configuration resources, for example, configures at least two configuration resources which are the first configuration resource and the second configuration resource respectively. In an embodiment, the first configuration resource is configured to the first node group containing R16 nodes for use, and the second configuration resource is configured to the second node group containing R17 nodes for use or the first configuration resource and the second configuration resource are jointly configured to the second node group containing R17 nodes for use.

After configuring the above configuration resources, the network side needs to inform the nodes in each node group of the configured resources. In an embodiment of the present application, the network side may transmit the resource configuration information carrying the first configuration resource and the second configuration resource to nodes in the first node group and the second node group.

Step 101: generating a first signal and transmitting the first signal based on the resource configuration information for the first node group and the second node group monitoring the first signal based on respective configuration resources.

After transmitting the resource configuration information, the network side generates the first signal, such as a DCI message. The first signal carries the transmission resource. After receiving the first signal and parsing the transmission resource, the node can receive a second signal, such as a paging, transmitted by the network side at the corresponding position based on the transmission resource.

When the network side transmits the first signal, the first signal is transmitted based on the resource configuration information. In an embodiment, the first signal may be transmitted based on the configured first configuration resource and second configuration resource. Since the first configuration resource and the second configuration resource have been transmitted to the corresponding node groups previously, each node in the first node group and the second node group can monitor the first signal based on respective configuration resources. For example, each node in the first node group may monitor the first signal based on the first configuration resource. Each node in the second node group may monitor the first signal based on the second configuration resource; each node in the second node group may monitor the first signal based on a combination of the first configuration resource and the second configuration resource.

Step 102: generating a second signal and transmitting the second signal on a transmission resource indicated by the first signal for the first node group and the second node group receiving the second signal based on the transmission resource indicated by the first signal after the first signal is monitored.

After generating and transmitting the first signal, the network side can continue to transmit a second signal, and transmit the second signal based on the transmission resources included in the first signal. Nodes of each node group can monitor and receive the second signal transmitted by the network side based on the transmission resource since the first signal carries the transmission resource used by the network side to transmit the second signal and the transmission resource has been successfully parsed and obtained by the nodes of each node group based on the configuration resources configured for the node group. The first signal and the second signal may be generated simultaneously or sequentially, which is not limited in an embodiment of the present application.

In the method for transmitting signals according to embodiments of the present application, by grouping nodes and allocating corresponding configuration resource for each node group, a first signal is transmitted based on the configuration resource, the first signal carries the transmission resource for indicating each node to monitor and receive the second signal subsequently transmitted by the network side based on the transmission resource, which can reduce a problem of collision under multiple P-RNTI configurations, avoid ineffective paging monitoring by the node, and save power consumption of the nodes.

In the embodiment of the present application, the first configuration resource and the second configuration resource may be configured differently according to actual needs. Two feasible schemes are provided below, but it should be noted that the protection scope of the embodiment of the present application does not limit to this. Two different configuration schemes are described below in detail.

Scheme 1: the first configuration resource includes a first parameter configuration in a first resource set, and the second configuration resource includes a second parameter configuration in the first resource set.

In an embodiment, the network side first configures one resource set, which is referred to as the first resource set in the embodiment of the present application. The first resource set includes at least two different parameter configurations, for example, a first parameter configuration and a second parameter configuration. The first parameter configuration in the first resource set is configured as the first configuration resource and configured to the first node group for use. The second parameter configuration in the first resource set is configured as the second configuration resource and configure to the second node group for use. In one embodiment, the first parameter configuration and the second parameter configuration in the first resource set are configured together as a combination and configured to the second node group for use.

The generating and transmitting, by the network side, the first signal, where the first signal is transmitted based on the resource configuration information, the first node group and the second node group monitor the first signal based on respective configuration resources may include:

generating and transmitting, by the network side, the first signal, where the first signal is transmitted based on the first resource set for the first node group monitoring the first signal based on the first parameter configuration, and for the second node group monitoring the first signal based on the second parameter configuration, or for the second node group monitoring the first signal based on the combination of the first parameter configuration and the second parameter configuration; where the first resource set is the resource configuration information. In an embodiment, the resource configuration information includes the first parameter configuration and the second parameter configuration included in the first resource set.

In an embodiment, the network side may transmit the first signal based on the first parameter configuration. In this case, the nodes in the first node group can monitor the first signal based on the first parameter configuration since the first parameter configuration is configured to the first node group.

The network side may transmit the first signal based on the second parameter configuration. In this case, the nodes in the second node group can monitor the first signal based on the second parameter configuration since the second parameter configuration is configured to the second node group.

The network side may transmit the first signal based on both the first parameter configuration and the second parameter configuration. In this case, the nodes in the second node group can monitor the first signal based on a combination of the first parameter configuration and the second parameter configuration since the combination of the first parameter configuration and the second parameter configuration is configured to the second node group.

Scheme 2: the first configuration resource includes a third parameter configuration in a second resource set, and the second configuration resource includes a fourth parameter configuration in a third resource set;

In an embodiment, the network side first configures two resource sets, which are referred to as the second resource set and the third resource set in the embodiment of the present application. The second resource set includes at least the third parameter configuration and the third resource set includes at least the fourth parameter configuration. The third parameter configuration in the second resource set is configured as the first configuration resource and configured to the first node group for use. The fourth parameter configuration in the third resource set is configured as the second configuration resource and configured to the second node group for use. In one embodiment, the third parameter configuration in the second resource set and the fourth parameter configuration in the third resource set are configured together as a combination and configured to the second node group for use.

The first signal includes a third signal and/or a fourth signal. The generating and transmitting, by the network side, the first signal, where the first signal is transmitted based on the resource configuration information, the first node group and the second node group monitor the first signal based on respective configuration resources may include:

generating and transmitting, by the network side, the third signal, where the third signal is transmitted based on the third parameter configuration in the second resource set for the first node group and/or the second node group monitoring the third signal based on the third parameter configuration, the third parameter configuration in the second resource set being the resource configuration information; and/or generating and transmitting the fourth signal, where the fourth signal is transmitted based on the fourth parameter configuration in the third resource set for the second node group monitoring the fourth signal based on the fourth parameter configuration, the fourth parameter configuration in the third resource set being the resource configuration information.

In an embodiment, the network side may transmit the third signal based on the third parameter configuration in the second resource set. In this case, the nodes in the first node group can monitor the third signal based on the third parameter configuration since the third parameter configuration is configured to the first node group. The nodes in the second node group can also monitor the third signal based on the third parameter configuration since the third parameter configuration is also configured to the second node group.

The network side may transmit the fourth signal based on the fourth parameter configuration in the third resource set. In this case, the nodes in the second node group can monitor the fourth signal based on the fourth parameter configuration since the fourth parameter configuration is configured to the second node group.

In an embodiment, the second configuration resource may further include a fifth parameter configuration in the second resource set. For example, the second resource set further includes the fifth parameter configuration besides the third parameter configuration. In an embodiment, the method may further include:

transmitting, by the network side, the fourth signal based on the fifth parameter configuration in the second resource set for the second node group monitoring the fourth signal based on the fifth parameter configuration; where the fifth parameter configuration in the second resource set is the resource configuration information.

In an embodiment, the network side may transmit the fourth signal based on the fifth parameter configuration in the second resource set. In this case, the nodes in the second node group can monitor the fourth signal based on the fifth parameter configuration since the fifth parameter configuration is configured to the second node group.

Based on the foregoing embodiments of scheme 2, the second signal may include a fifth signal and/or a sixth signal. The generating and transmitting, by the network side, the second signal, where the second signal is transmitted on the transmission resource indicated by the first signal, and the first node group and the second node group receive the second signal based on the transmission resource indicated by the first signal after the first signal is monitored, includes:

generating and transmitting, by the network side, the fifth signal, where the fifth signal is transmitted on a transmission resource indicated by the third signal for the first node group and/or the second node group receiving the fifth signal based on the transmission resource indicated by the third signal after the third signal is monitored; and/or generating and transmitting, by the network side, the sixth signal, where the sixth signal is transmitted on a transmission resource indicated by the fourth signal for the second node group receiving the sixth signal based on the transmission resource indicated by the fourth signal after the fourth signal is monitored.

In an embodiment, after generating the fifth signal, the network side transmits the fifth signal on the transmission resource carried in the previously transmitted third signal. In this case, the first node group and/or the second node group may receive the fifth signal based on the transmission resource indicated by the third signal after the third signal is monitored since the third signal can be received by the first node group and/or the second node group.

In an embodiment, after generating the sixth signal, the network side transmits the sixth signal on the transmission resource indicated by the previously transmitted fourth signal. In this case, the second node group may receive the sixth signal based on the transmission resource indicated by the fourth signal after the fourth signal is monitored since the fourth signal can be received by the second node group.

In each method embodiment above, each of the first configuration resource and the second configuration resource include at least one of: time-frequency resource configuration, aggregation level (AL), numbers of blind decoding, candidates, or search space configuration; where the search space configuration includes at least one of a search space period, a search space offset, or a symbol pattern for each physical downlink control channel (PDCCH) monitoring occasion.

In each method embodiment above, each of the first resource set, the second resource set and the third resource set includes at least one of: one or more slots, one or more symbols, one or more control resource sets (CORESET), one or more search spaces (SS), or one or more monitoring occasions (MO).

In an embodiment, for each of the first resource set, the second resource set and the third resource set, the network side configures and/or transmits each of the first resource set, the second resource set and the third resource set through at least one of predefining, broadcast messages, system messages, or radio resource control (RRC) signaling/messages. Each of the first resource set, the second resource set and the third resource set is only configured if the predefining is adopted, while each of the first resource set, the second resource set and the third resource set is configured and transmitted if the broadcast messages, system messages, or radio resource control (RRC) signaling/messages are adopted. Other network elements may also perform configuration, and the network side only performs transmission.

Each of the first resource set, the second resource set and the third resource set may be used for carrying PDCCH, or for carrying DCI, or for carrying CORESET, or for carrying search space.

In the above method embodiments, the search spaces of the first resource set and the second resource set include a common search space (CSS); the search space of the third resource set includes at least one of a common search space or a node-specific search space. The common search space may include at least one of type0 CSS, type0A CSS, type1 CSS, type2 CSS or type3 CSS.

In above method embodiments, any one or any combination of the followings may also be included:

each of the first configuration resource and the second configuration resource is configured with a corresponding monitoring priority to indicate whether to monitor and/or a monitoring order;

one of the first configuration resource and the second configuration resource is configured with a monitoring priority to indicate whether to monitor and/or a monitoring order;

each of the first node group and the second node group is configured with a corresponding monitoring priority to indicate whether to monitor and/or a monitoring order; or one of the first node group and the second node group is configured with a corresponding monitoring priority to indicate whether to monitor and/or a monitoring order.

In an embodiment, each of the first configuration resource and the second configuration resource is configured with the corresponding monitoring priority, which includes any one or any combination of:

each of the first resource set, the second resource set and the third resource set is configured with a corresponding monitoring priority;

one or more of the first resource set, the second resource set and the third resource set are configured with a monitoring priority to indicate whether to monitor and/or a monitoring order; one or more of the first resource set, the second resource set and the third resource set may be one resource set among them or several resource sets among them, which is not limited here;

each parameter configuration is configured with a corresponding monitoring priority; or one or more of the parameter configuration are configured with a monitoring priority to indicate whether to monitor and/or a monitoring order. One or more of the parameter configurations may be one parameter configuration or several parameter configurations, which is not limited here.

In the above method embodiments, the first node group and the second node group may be grouped by at least one of:

grouping numbers configured by a network, network-predefined rules or information reported by nodes;

where the grouping numbers are configured and/or transmitted through at least one of predefining, broadcast messages, system messages, or radio resource control (RRC) signaling/messages.

Figure 2:
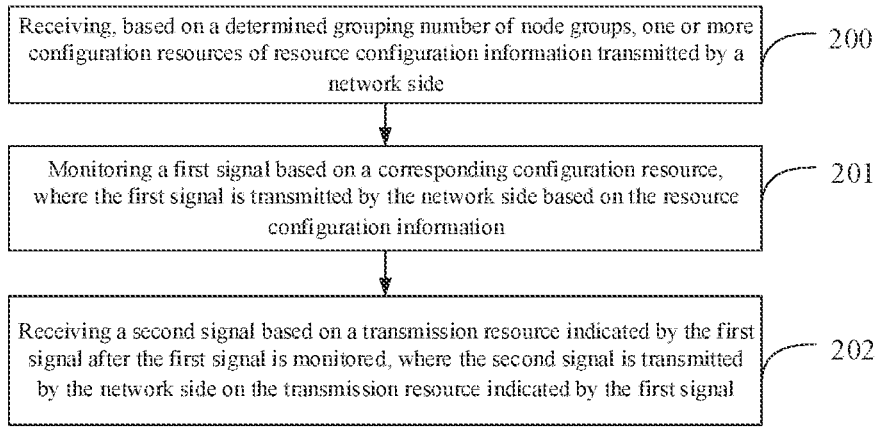
FIG. 2 is a schematic flow chart of a method for receiving signals according to an embodiment of the present application.

FIG. 2 is a schematic flow chart of a method for receiving signals according to an embodiment of the present application. As shown in FIG. 2, the method includes the following steps:

step 200: receiving, based on a determined grouping number of node groups, one or more configuration resources of resource configuration information transmitted by a network side, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group.

In the embodiments of the present, under RRC-Idle/Inactive states, in order to reduce the power consumption of nodes and reduce paging monitoring, the network side provide services for nodes with different version types respectively by configuring a plurality of different configuration resources. In each embodiment of the present application, a node may be a UE or other devices, and the other devices include at least one of the following, a mechanical device or a vehicle. One or more nodes form a node group. Nodes with different versions are managed in groups. For example, a node group containing R16 nodes can be called the first node group, and a node group containing R17 nodes can be called the second node group. It should be noted that, the foregoing grouping is only used as an example to introduce the solutions of the embodiments of the present application, and the manner of grouping nodes may be set according to actual conditions, and is not limited here. It should be noted that the first node group includes at least one node, and the second node group includes at least one node. The network may include at least one of a base station, a core network, or some powerful nodes with control functions.

In order to solve the problem of collision between DCI resources scrambled by multiple P-RNTIs, the network side configures multiple different configuration resources, in an embodiment, configures at least two configuration resources, which are the first configuration resource and the second configuration resource respectively. The first configuration resource is configured to the first node group containing the R16 nodes for use. The second configuration resource is configured to the second node group containing the R17 nodes for use, or the first configuration resource and the second configuration resource are jointly configured to the second node group containing the R17 nodes for use.

Each node group corresponds to its own grouping number, and the nodes in each node group can obtain their respective grouping numbers to know which node group they belong to.

After configuring the above configuration resources, the network side needs to inform the nodes in each node group of the configured resources. In an embodiment of the present application, the network side may carry the first configuration resource and the second configuration resource in the resource configuration information, and transmit them to nodes in the first node group and the second node group.

The nodes in each node group first determine the corresponding group number of the node group, and then receive the configuration resources transmitted by the network side to themselves.

Step 201: monitoring a first signal based on a corresponding configuration resource, where the first signal is transmitted by the network side based on the resource configuration information.

After transmitting the resource configuration information, the network side generates the first signal, such as a DCI message. The first signal carries the transmission resource. After receiving the first signal and parsing the transmission resource, the node can receive a second signal, such as a paging, transmitted by the network side at the corresponding position based on the transmission resource.

When the network side transmits the first signal, the first signal is transmitted based on the resource configuration information. In an embodiment, the first signal may be transmitted based on the configured first configuration resource and second configuration resource. Since the first configuration resource and the second configuration resource have been transmitted to the corresponding node groups previously, each node in the first node group and the second node group can monitor the first signal based on respective configuration resources. For example, each node in the first node group may monitor the first signal based on the first configuration resource. Each node in the second node group may monitor the first signal based on the second configuration resource; each node in the second node group may monitor the first signal based on a combination of the first configuration resource and the second configuration resource.

Step 202: receiving a second signal based on a transmission resource indicated by the first signal after the first signal is monitored, where the second signal is transmitted by the network side on the transmission resource indicated by the first signal.

After generating and transmitting the first signal, the network side can continue to transmit the second signal, and transmit the second signal based on the transmission resource included in the first signal. Nodes in each node group can monitor and receive the second signal transmitted by the network side based on the transmission resource since the first signal carries the transmission resource used by the network side to transmit the second signal, and the transmission resource has been successfully parsed and obtained by the nodes in each node group based on the configuration resource configured to the node group. The first signal and the second signal may be generated simultaneously or sequentially, which is not limited in an embodiment of the present application.

In the method for receiving signals according to embodiments of the present application, by grouping nodes and allocating corresponding configuration resource to each node group, a first signal is transmitted based on the configuration resource, the first signal carries the transmission resource for indicating each node to monitor and receive the second signal subsequently transmitted by the network side based on the transmission resource, which can reduce a problem of collision under multiple P-RNTI configurations, avoid ineffective paging monitoring by the nodes, and save power consumption of the nodes.

In the embodiment of the present application, the first configuration resource and the second configuration resource may be configured differently according to actual needs. Two feasible schemes are provided below, but it should be noted that the protection scope of the embodiment of the present application does not limit to this. The detail of the two different schemes can be referred the above description, and will not be repeated here.

In the above method embodiment, the first configuration resource includes a first parameter configuration in a first resource set, and the second configuration resource includes a second parameter configuration in the first resource set; the monitoring the first signal based on the corresponding configuration resource, where the first signal is transmitted by the network side based on the resource configuration information, includes:
monitoring, by the first node group, the first signal based on the first parameter configuration; and monitoring, by the second node group, the first signal based on the second parameter configuration; or monitoring, by the second node group, the first signal based on the combination of the first parameter configuration and the second parameter configuration.

In the above method embodiment, the first configuration resource includes a third parameter configuration in a second resource set, and the second configuration resource includes a fourth parameter configuration in a third resource set; the first signal includes a third signal and/or a fourth signal;
The monitoring the first signal based on the corresponding configuration resource, includes:
monitoring, by the first node group and/or the second node group, the third signal based on the third parameter configuration in the second resource set; and/or
monitoring, by the second node group, the fourth signal based on the fourth parameter configuration in the third resource set.

In the above method embodiment, the second configuration resource further includes a fifth parameter configuration in the second resource set; and the method further includes:
monitoring, by the second node group, the fourth signal based on the fifth parameter configuration.

In the above method embodiment, the second signal includes a fifth signal and/or a sixth signal, the receiving the second signal based on the transmission resource indicated by the first signal after the first signal is monitored, where the second signal is transmitted by the network side on the transmission resource indicated by the first signal, includes:
receiving, by the first node group and/or the second node group, the fifth signal based on the transmission resource indicated by the third signal after the third signal is monitored; and/or
receiving, by the second node group, the sixth signal based on the transmission resource indicated by the fourth signal after the fourth signal is monitored.

In each method embodiment above, each of the first configuration resource and the second configuration resource include at least one of: time-frequency resource configuration, aggregation level (AL), numbers of blind decoding, candidates, or search space configuration; where the search space configuration includes at least one of a search space period, a search space offset, or a symbol pattern for each physical downlink control channel (PDCCH) monitoring occasion.

In each method embodiment above, each of the first resource set, the second resource set and the third resource set includes at least one of: one or more slots, one or more symbols, one or more control resource sets (CORESET), one or more search spaces (SS), or one or more monitoring occasions (MO); and
each of the first resource set, the second resource set and the third resource set is configured and/or received through at least one of predefining, broadcast messages, system messages, or radio resource control (RRC) signaling/messages.

In the above method embodiments, the search space of the first resource set or the search space of the second resource set includes a common search space.

The search space of the third resource set includes at least one of a common search space or a node-specific search space.

In above method embodiments, any one or any combination of the followings is further included:
- each of the first configuration resource and the second configuration resource is configured with a corresponding monitoring priority to indicate whether to monitor and/or a monitoring order;
- one of the first configuration resource and the second configuration resource is configured with a monitoring priority to indicate whether to monitor and/or a monitoring order;
- each of the first node group and the second node group is configured with a corresponding monitoring priority to indicate whether to monitor and/or a monitoring order; or
- one of the first node group and the second node group is configured with a corresponding monitoring priority to indicate whether to monitor and/or a monitoring order.

In an embodiment, the method further includes:
- monitoring or sequentially monitoring, by the first node group and the second node group, according to configured monitoring priorities.

In the above method embodiments, each of the first configuration resource and the second configuration resource is configured with a corresponding monitoring priority, which includes any one or any combination of:
- each of the first resource set, the second resource set and the third resource set is configured with a corresponding monitoring priority;
- one or more of the first resource set, the second resource set and the third resource set are configured with a monitoring priority to indicate whether to monitor and/or a monitoring order; where one or more of the first resource set, the second resource set and the third resource set may be one resource set or several resource sets, which is not limited here;
- each parameter configuration is configured with a corresponding monitoring priority; or
- one or more of the parameter configuration are configured with a monitoring priority to indicate whether to monitor and/or a monitoring order. One or more of the parameter configurations may be one parameter configuration or several parameter configurations, which is not limited here.

In the above method embodiments, the monitoring priority includes at least one of the followings: whether the resource set is monitored and/or the monitoring order, or whether different parameter configurations of the resource set are monitored and/or the monitoring order. The monitoring priorities are the same, or the network does not configure a monitoring priority indicates that all configured resource sets need to be received and monitored. High monitoring priority indicates that a resource set and/or the parameter configuration of the resource set needs to be preferentially monitored. Low monitoring priority indicates that the resource set and/or the parameter configuration of the resource set does not need to be monitored preferentially or indicates that the resource set and/or the parameter configuration of the resource set needs to be monitored lastly.

In an embodiment, the network configures a monitoring priority of parameter configurations in the first resource set for the first node group and the second node group, or the network configures a monitoring priority of the first parameter configuration and the second parameter configuration in the first resource set for the second node group, or the network configures a high monitoring priority of parameter configurations in the first resource set for the second node group or the network configures a low monitoring priority of parameter configurations in the first resource set for the second node group. In the above method embodiments, the first node group and the second node group are grouped based on at least one of:
- grouping numbers configured by a network, network-predefined rules or information reported by nodes;
- where the grouping numbers are configured and/or received through at least one of predefining, broadcast messages, system messages, or radio resource control (RRC) signaling/messages.

The solution is further described below by two examples.

Example 1

At a network side:

Step 1: the network side configures a first resource set, where the first resource set includes at least two sets of parameter configurations.

Each parameter configuration includes at least one of the followings: time-frequency resource allocation, aggregation level (AL), and SS configuration. Where the SS configuration includes at least one of a search space period, a search space offset, or a symbol pattern for each PDCCH monitoring occasion.

The search space of the first resource set is a common search space (CSS), and the common search space includes at least one of type0 CSS, type0A CSS, type1 CSS, type2 CSS, and type3 CSS.

The network side further configures the monitoring priority as follows:
- each of the first configuration resource and the second configuration resource is configured with a corresponding monitoring priority to indicate whether to monitor and/or a monitoring order;
- one of the first configuration resource and the second configuration resource is configured with a monitoring priority to indicate whether to monitor and/or a monitoring order;
- each of the first node group and the second node group is configured with a corresponding monitoring priority to indicate whether to monitor and/or a monitoring order; and/or
- one of the first node group and the second node group is configured with a corresponding monitoring priority to indicate whether to monitor and/or a monitoring order.

The node can monitor the first signal under a parameter configuration with the monitoring priority; or,
- the node can monitor the first signal under a parameter configuration with non-low monitoring priority.

For example, each of the first configuration resource and the second configuration resource is configured with the corresponding monitoring priority, which includes any one or any combination of:
- each of the first resource set, the second resource set and the third resource set is configured with a corresponding monitoring priority;
- one or more of the first resource set, the second resource set and the third resource set are configured with a monitoring priority to indicate whether to monitor and/or a monitoring order;
- each parameter configuration is configured with a corresponding monitoring priority; or one or more of the parameter configuration are configured with a monitoring priority to indicate whether to monitor and/or a monitoring order.

Step 2: the network side configures the first signal.

In an embodiment, the first signal used for carrying control information, which may be at least one of the following DCI formats: DCI format 0-0, DCI format 0-1, DCI format 1-0, DCI format 1-1, DCI format 0-2, DCI format 1-2, DCI format 2-0, DCI format 2-1, DCI format 2-2, DCI format 2-3, DCI format 2-4, DCI format 2-5 and DCI format 2-6. The above are only examples for description, and it should be noted that the protection scope of the embodiments of the present application is not limited thereto.

The first signal includes control information of at least one group of nodes, and different nodes are grouped by at least one of the following ways: the network side directly configures the grouping number; the network side pre-defines rules, and each node obtains the grouping number according to the pre-defined rules; each node reports information, and the network side configures the grouping number according to information reported by the node. The information reported by the node includes at least one of the following: the node's capability information or information of grouping number expected by the node. The node's capability information includes at least one of the followings: attributes of the node's NR version, such as R-x, where x can be a positive integer greater than 8, such as R17, R16, R15, R14, R13, R12, R11, R10, R9, R8, and PDCCH monitoring capability of the node, which includes at least one of the followings: the number of candidates, AL or the total number of blind decoding.

The control information includes at least one of the following control information scrambled by RNTI: system information RNTI (SI-RNTI), random access RNTI (RA-RNTI), message-B RNTI (MsgB-RNTI), temporary cell-RNTI (TC-RNTI), paging RNTI (P-RNTI), cell RNTI (C-RNTI), modulation mode scheme-cell-RNTI (MCS-C-RNTI), configured scheduling-RNTI (CS-RNTI), semi-persistent channel state indicator-RNTI (SP-CSI-RNTI), slot format indicator-RNTI (SFI-RNTI), interrupted transmission (INT-RNTI), transmission power control PUSCH RNTI (TPC-PUSCH-RNTI), transmission power control PUCCH RNTI (TPC-PUCCH-RNTI), transmission power control sounding reference symbols RNTI (TPC-SRS-RNTI) and may further include media access control address random access response (MAC RAR) scheduling, MAC fallback RAR, transmission of message A (MsgA) PUSCH.

Step 3: the network transmits the first signal on the first resource set.

The network side transmits the first signal according to the configuration of the first resource set. The first signal includes control information of the first node group and control information of the second node group.

Step 4: The network side transmits a second signal on the resource indicated by the first signal.

The second signal is transmitted based on the indication of the first signal. The network side transmits the second signal on the resource indicated by the first signal. The second signal includes at least one data transmission in downlink and uplink. The data transmission may carry at least one of the followings: paging message, system message, RRC signaling/message, service data transmission, transmission interruption indicator message, power control message, and symbol subframe type indicator message.

At a node side:

In step 1, the node obtains the node group information, and the node receives the configuration of the resource set.

The node obtains the node group information includes at least one of the followings: the node configures the node group information, the node receives the node group information configured by the network, and the node obtains the node group information according to a rule predefined with the network.

The node receives the configuration of the resource set includes at least one of: obtaining the configuration of the resource set according to the network-predefined rules, obtaining broadcast messages, obtaining system messages, and obtaining resource set configurations configured by the RRC signaling.

The nodes in the first node group obtain the second parameter configuration in the first resource set; and the nodes in the second node group obtain the first parameter configuration and the second parameter configuration in the first resource set.

In step 2, each node monitors the first signal on their parameter configuration configured for them.

In an embodiment, each node obtains the monitoring priority, and the monitoring priority is configured by at least one of the followings: predefining, broadcast message, system message, RRC information/signaling, and self-configuration.

The node determines whether to monitor at the first parameter configuration and the second parameter configuration in the first resource set and/or the monitoring order according to the obtained monitoring priority.

When the first parameter configuration and/or the second parameter configuration are configured with different monitoring priorities, the node monitors the parameter configuration with a high monitoring priority first. When the first signal is monitored under the parameter configuration with the high monitoring priority, the node monitors the first signal under the parameter configuration with the low monitoring priority and otherwise, the node does not monitor or skips monitoring the first signal under the parameter configuration with the low monitoring priority; or, the node monitors the first signal under the parameter configuration with the monitoring priority; or, the node monitors the first signal under a parameter configuration with non low monitoring priority.

When the first parameter configuration and/or the second parameter configuration are configured with the same monitoring priority, the node monitors the first parameter configuration and/or the second parameter configuration.

In step 3, for example, the node receives the second signal.

The node receives the second signal on the resource indicated by the first signal after obtaining the first signal. Otherwise, the node does not receive the second signal, or skips the reception of the second signal.

Example 2

At a network side:

In step 1, the network side configures the second resource set and the third resource set, the second resource set is configured to the first node group, the second resource set and the third resource set are configured to the second node group, or the third resource set is configured to the second node group. The parameter configuration in the second resource set includes the third parameter configuration and/ or the fifth parameter configuration. The parameter configuration in the third resource set includes the fourth parameter configuration.

Each parameter configuration includes at least one of the followings: time-frequency resource allocation, aggregation level (AL), and SS configuration. Where the SS configuration includes at least one of a search space period, a search space offset, or a symbol pattern for each PDCCH monitoring occasion.

The search space of the second resource set is a common search space (CSS), and the common search space includes at least one of type0 CSS, type0A CSS, type1 CSS, type2 CSS, and type3 CSS.

The search space of the third resource set includes at least one of a common search space or a node-specific search space. The common search space includes at least one of type0 CSS, type0A CSS, type1 CSS, type2 CSS, and type3 CSS.

The network side configures the second resource set and the third resource set by at least one of predefining, broadcast messages, system messages, and RRC signaling/messages.

The third parameter configuration in the second resource set is used to indicate the information of the first node group, and the fourth parameter configuration in the third resource set is used to indicate the information of the second node group, or
 the fifth parameter configuration in the second resource set and the fourth parameter configuration in the third resource set are used to indicate the information of the second node group.

The network side configures the monitoring priority of the resource sets for the second node group, that is, the network configures the monitoring priority of the second resource set and the third resource set. In one embodiment, the network configures the monitoring priority of the parameter configuration in the resource sets. That is, the network configures monitoring priorities of the third parameter configuration in the second resource set, the fifth parameter configuration in the second resource set and the fourth parameter configuration in the third resource set. In one embodiment, the network configures the high monitoring priority of the resource set, or, the high monitoring priority of the parameter configuration in the resource set. In one embodiment, the network configures the low monitoring priority of the resource set, or the low monitoring priority of the parameter configuration in the resource set.

In step 2, the network side configures the third signal and the fourth signal.

In an embodiment, the third signal and the fourth signal may be at least one of the following DCI formats: DCI format 0-0, DCI format 0-1, DCI format 1-0, DCI format 1-1, DCI format 0-2, DCI format 1-2, DCI format 2-0, DCI format 2-1, DCI format 2-2, DCI format 2-3, DCI format 2-4, DCI format 2-5, DCI format 2-6. The above are only examples for description, and it should be noted that the protection scope of the embodiments of the present application is not limited thereto.

The third signal includes control information of the first node group;
 the fourth signal includes control information of the second node group; or
 the third signal and the fourth signal includes control information of the second node group.

In step 3, the network side transmits the third signal based on the third parameter configuration in the second resource set, and transmits the fourth signal based on the fourth parameter configuration in the third resource.

In step 4, the network side transmits the fifth signal on the resource indicated by the third signal, and transmits the sixth signal on the resource indicated by the fourth signal.

The fifth signal is transmitted based on the instruction of the third signal. The network transmits the fifth signal on the resource indicated by the third signal. The fifth signal includes at least one data transmission in downlink and uplink. The data transmission may carry at least one of the followings: paging message, system message, RRC signaling/message, service data transmission, transmission interruption indicator message, power control message, and symbol subframe type indicator message.

The sixth signal is transmitted based on the instruction of the fourth signal.

At a node side:
In step 1, the node obtains the node group information, and the node receives the configuration of the resource set.

The node obtains the node group information, including at least one of the followings: the node configures the node group information, the node receives the node group information configured by the network, and the node obtains the node group information according to a rule predefined with the network.

The node receives the configuration of the resource set includes at least one of: obtaining the configuration of the resource set according to the network-predefined rules, obtaining broadcast messages, obtaining system messages, and obtaining resource set configurations configured by the RRC signaling.

The nodes in the first node group obtain the third parameter configuration in the second resource set; and the nodes in the second node group obtain the third parameter configuration in the second resource set and the fourth parameter configuration in the third resource set.

In step 2, each node monitors the first signal on their parameter configuration configured for them.

In an embodiment, each node obtains the monitoring priority, and the monitoring priority is configured by at least one of the followings: predefining, broadcast message, system message, RRC information/signaling, and self-configuration.

The node determines whether to monitor in the second resource set and the third resource set and/or the monitoring order according to the obtained monitoring priority.

When the second resource set and third resource set are configured with different monitoring priorities, the node monitors the resource set with a high monitoring priority first. When the first signal is monitored under the resource set with the high monitoring priority, monitoring the first signal under the resource set with a low monitoring priority and otherwise, the node does not monitor or skips monitoring the first signal under the resource set with the low monitoring priority; or the node monitors the first signal under the resource set with the high monitoring priority.

When the second resource set and third resource set are configured with the same monitoring priorities, the node monitors the second resource set and third resource set.

In one embodiment, the node determines whether to monitor at different parameter configurations and/or the monitoring order according to the obtained monitoring priority.

When the parameter configurations are configured with different monitoring priorities, the node monitors the parameter configuration with a high monitoring priority first. When the first signal is monitored under the parameter configuration with the high monitoring priority, the node monitors the first signal under the parameter configuration with the low monitoring priority and otherwise, the node does not monitor or skips monitoring the first signal under the parameter configuration with the low monitoring priority.

In step 3, for example, the node receives the second signal.

The node receives the second signal on the resource indicated by the first signal after obtaining the first signal. Otherwise, the node does not receive the second signal, or skips the reception of the second signal.

In the method embodiments of the present application, the power consumption of nodes is reduced and the paging monitoring is reduced under RRC-Idle/Inactive states. In addition, ineffective paging monitoring is decreased by configuring multiple P-RNTI configurations, that is, node-specific P-RNTIs. In order to avoid the problem of collision under multiple P-RNTI configurations, the number of paging candidates is increased and the problem of collision between multiple P-RNTIs is avoided or reduced by configuring, in an embodiment of the present application, at least two sets of parameter configurations for the paging search space under the traditional PDCCH resources, for example, the R16 node works in the first parameter configuration, and the R17 node works in the second parameter configuration. By configuring more paging PDCCH resources including CORESET and search space, and configuring different priorities, the R17 node can monitor both original paging resources and the newly added paging resources, and can continue to monitor multiple P-RNTIs at the node level after the P-RNTIs at the cell level is monitored on original paging resources and thus the node can accurately know whether to perform paging reception in the subsequent PO. And then, unnecessary paging reception is reduced, and the power consumption of the nodes is reduced.

Figure 3:
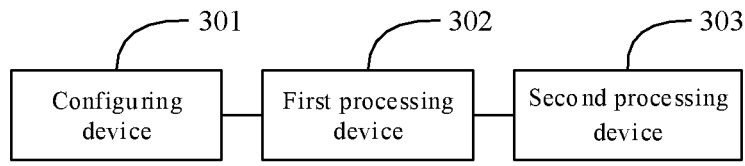
FIG. 3 is a schematic structural diagram of an apparatus for transmitting signals according to an embodiment of the present application.

FIG. 3 is a schematic structural diagram of an apparatus for transmitting signals according to an embodiment of the present application. As shown in FIG. 3, the apparatus includes a configuring device 301, a first processing device 302 and a second processing device 303, in which:

the configuring device 301, used to transmit resource configuration information, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;

the first processing device 302, used to generate and transmit a first signal, where the first signal is transmitted based on the resource configuration information, the first node group and the second node group monitor the first signal based on respective configuration resources, and the second processing device 303, used to generate and transmit a second signal, where the second signal is transmitted on a transmission resource indicated by the first signal, the first node group and the second node group receive the second signal based on the transmission resource indicated by the first signal after the first signal is monitored.

In the apparatus for transmitting signals according to embodiments of the present application, by grouping nodes and allocating corresponding configuration resource to each node group, a first signal is transmitted based on the configuration resource, the first signal carries the transmission resource for indicating each node to monitor and receive the second signal subsequently transmitted by the network side based on the transmission resource, which can reduce a problem of collision under multiple P-RNTI configurations, avoid ineffective paging monitoring by the node, and save power consumption of the nodes.

Figure 4:
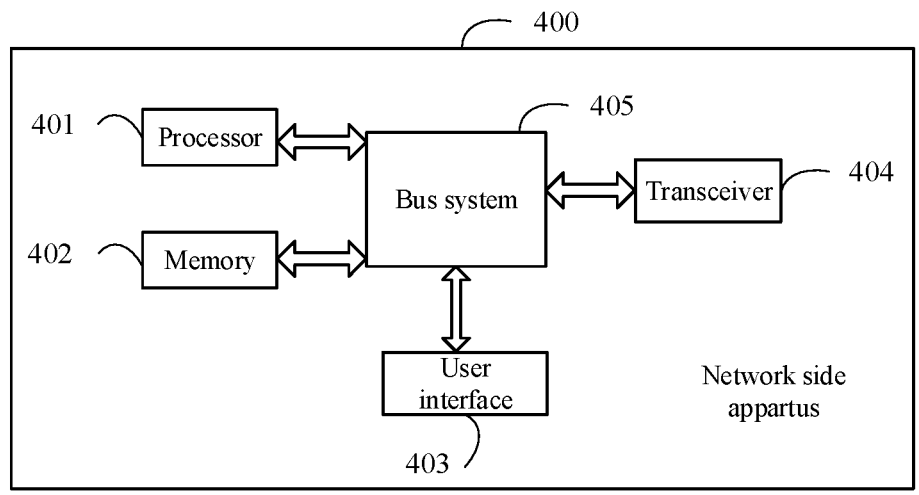
FIG. 4 is a schematic structural diagram of a network-side device according to an embodiment of the present application.

FIG. 4 is a schematic structural diagram of a network side apparatus according to an embodiment of the present application. As shown in FIG. 4, the network side apparatus 400 may include at least one processor 401, a memory 402, at least one other user interface 403, and a transceiver 404. Respective components in the network-side device 400 are coupled together through the bus system 405. It should be noted that the bus system 405 is used to realize the connection and communication between these components. In addition to the data bus, the bus system 405 also includes a power bus, a control bus and a status signal bus. However, for the sake of clarity, in FIG. 4, respective buses are labeled as the bus system 405, and the bus system may include any number of interconnected buses and bridges, which are linked together through various circuits of one or more processors represented by processor 401 and one or more memories represented by the memory 402. The bus system can also link together various other circuits, such as peripherals, voltage regulators, and power management circuits, which will not be further described in the embodiments of the present application. The bus interface provides an interface. Transceiver 404 may be a number of elements, including a transmitter and a receiver, which provide components for communicating with various other devices over a transmission medium. For different user equipment, the user interface 403 may also be an interface to externally or internally connecting the required equipment, and the connected equipment includes, but not limited to, a keypad, a display, a speaker, a microphone, a joystick, and the like.

It should be noted that the memory 402 in the embodiments of the present application may be a volatile memory or a non-volatile memory, or may include both volatile and non-volatile memory. The non-volatile memory may be read-only memory (ROM), programmable read-only memory (PROM), erasable programmable read-only memory (Erasable PROM, EPROM), electrically erasable programmable read-only memory (Electrically EPROM, EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ES-DRAM), Synchlink DRAM (SLDRAM) and direct Rambus RAM (DRRAM). The memory 402 in the systems and methods described in various embodiments of the present application is intended to include, but not be limited to, these and any other suitable types of memory.

The processor 401 is responsible for managing the bus system and general processing, and the memory 402 can store computer programs or instructions used by the processor 401 when performing operations. In an embodiment, the processor 401 can be configured for:

transmitting resource configuration information, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;

generating a first signal and transmitting the first signal based on the resource configuration information for the first node group and the second node group monitoring the first signal based on respective configuration resources, and generating a second signal and transmitting the second signal on a transmission resource indicated by the first signal for the first node group and the second node group receiving the second signal based on the transmission resource indicated by the first signal after the first signal is monitored.

The methods disclosed in the above embodiments of the present application may be applied to the processor 401 or implemented by the processor 401. The processor 401 may be an integrated circuit chip with signal processing capability. In the implementation process, each step of the above methods may be completed by an integrated logic circuit of hardware in the processor 401 or an instruction in the form of software. The above processor 401 may be a general purpose processor, a digital signal processor (DSP), an application specific integrated circuit (ASIC), a field programmable gate array (FPGA) or other programmable logic devices, discrete gate or transistor logic devices, discrete hardware components. The methods, steps, and logic block diagrams disclosed in the embodiments of the present application may be implemented or executed by these ways. A general purpose processor may be a microprocessor or the processor may be any conventional processor and the like. The steps of the method disclosed in conjunction with the embodiments of the present application may be directly embodied as executed by a hardware decoding processor, or executed by a combination of hardware and software modules in the decoding processor. The software module can be located in random access memory, flash memory, read-only memory, programmable read-only memory or electrically erasable programmable memory, registers and other mature storage media in the art. The storage medium is located in the memory 402, and the processor 401 reads the information in the memory 402, and completes the steps of the above methods in combination with its hardware.

It should be noted that the embodiments described herein may be implemented in hardware, software, firmware, middleware, microcode, or a combination thereof. For hardware implementation, the processing unit may be implemented in one or more application specific integrated circuits (ASIC), digital signal processing (DSP), DSP device (DSPD), programmable logic device (PLD), field-programmable gate array (FPGA), general purpose processor, controller, microcontroller, microprocessor, other electronic unit for performing the functions described in this application or a combination thereof.

For software implementation, the described solutions can be implemented through modules (such as procedures, functions and the like) that perform the functions described in the embodiments of the present application. Software codes can be stored in memory and executed by a processor. The memory can be implemented in the processor or external to the processor.

As another embodiment, the first configuration resource includes a first parameter configuration in a first resource set, and the second configuration resource includes a second parameter configuration in the first resource set.

The generating a first signal and transmitting the first signal based on the resource configuration information for the first node group and the second node group monitoring the first signal based on respective configuration resources, includes:

generating and transmitting the first signal, where the first signal is transmitted based on the first resource set for the first node group monitoring the first signal based on the first parameter configuration, and for the second node group monitoring the first signal based on the second parameter configuration, or for the second node group monitoring the first signal based on a combination of the first parameter configuration and the second parameter configuration; the first resource set is the resource configuration information and the resource configuration information includes the first parameter configuration and the second parameter configuration in the first resource set.

As another embodiment, the first configuration resource includes a third parameter configuration in a second resource set, and the second configuration resource includes a fourth parameter configuration in a third resource set; the first signal includes a third signal and/or a fourth signal.

The generating a first signal and transmitting the first signal based on the resource configuration information for the first node group and the second node group monitoring the first signal based on respective configuration resources, includes:

generating and transmitting the third signal, where the third signal is transmitted based on the third parameter configuration in the second resource set for the first node group and/or the second node group monitoring the third signal based on the third parameter configuration, the third parameter configuration in the second resource set being the resource configuration information; and/or generating and transmitting the fourth signal, where the fourth signal is transmitted based on the fourth parameter configuration in the third resource set for the second node group monitoring the fourth signal based on the fourth parameter configuration, the fourth parameter configuration in the third resource set being the resource configuration information.

As another embodiment, the second configuration resource further includes a fifth parameter configuration in the second resource set; and the method further includes:

transmitting the fourth signal based on the fifth parameter configuration in the second resource set for the second node group monitoring the fourth signal based on the fifth parameter configuration; the fifth parameter configuration in the second resource set being the resource configuration information.

As another embodiment, the second signal includes a fifth signal and/or a sixth signal; and the generating a second signal and transmitting the second signal on the transmission resource indicated by the first signal for the first node group and the second node group receiving the second signal based on the transmission resource indicated by the first signal after the first signal is monitored, includes:

generating and transmitting the fifth signal, where the fifth signal is transmitted on a transmission resource indicated by the third signal for the first node group and/or the second node group receiving the fifth signal based on the transmission resource indicated by the third signal after the third signal is monitored; and/or generating and transmitting the sixth signal, where the sixth signal is transmitted on a transmission resource indicated by the fourth signal for the second node group receiving the sixth signal based on the transmission resource indicated by the fourth signal after the fourth signal is monitored.

As another embodiment, each of the first configuration resource and the second configuration resource include at least one of: time-frequency resource configuration, aggregation level (AL), numbers of blind decoding, candidates, or search space configuration; where the search space configuration includes at least one of a search space period, a search space offset, or a symbol pattern for each physical downlink control channel (PDCCH) monitoring occasion.

As another embodiment, each of the first resource set, the second resource set and the third resource set includes at least one of: one or more slots, one or more symbols, one or more control resource sets (CORESET), one or more search spaces (SS), or one or more monitoring occasions (MO); and
each of the first resource set, the second resource set and the third resource set is configured and/or transmitted through at least one of predefining, broadcast messages, system messages, or radio resource control (RRC) signaling/messages.

As another embodiment, the search space of the first resource set or the search space of the second resource set includes a common search space;
the search space of the third resource set includes at least one of a common search space or a node-specific search space.

As another embodiment, any one or any combination of the followings are included:
each of the first configuration resource and the second configuration resource is configured with a corresponding monitoring priority to indicate whether to monitor and/or a monitoring order;
one of the first configuration resource and the second configuration resource is configured with a monitoring priority to indicate whether to monitor and/or a monitoring order;
each of the first node group and the second node group is configured with a corresponding monitoring priority to indicate whether to monitor and/or a monitoring order; or
one of the first node group and the second node group is configured with a corresponding monitoring priority to indicate whether to monitor and/or a monitoring order.

As another embodiment, each of the first configuration resource and the second configuration resource is configured with the corresponding monitoring priority, which includes any one or any combination of:
each of the first resource set, the second resource set and the third resource set is configured with a corresponding monitoring priority;
one or more of the first resource set, the second resource set and the third resource set are configured with a monitoring priority to indicate whether to monitor and/or a monitoring order; where one or more of the first resource set, the second resource set and the third resource set may be one resource set or several resource sets, which is not limited here;
each parameter configuration is configured with a corresponding monitoring priority; or
one or more of the parameter configuration are configured with a monitoring priority to indicate whether to monitor and/or a monitoring order, where one or more of the parameter configurations may be one parameter configuration or several parameter configurations, which is not limited here.

As another embodiment, the first node group and the second node group are grouped based on at least one of:
grouping numbers configured by a network, network-predefined rules or information reported by nodes;
where the grouping numbers are configured and/or transmitted through at least one of predefining, broadcast messages, system messages, or radio resource control (RRC) signaling/messages.

The network side apparatus according to the embodiment of the present application may perform various processes implemented by the terminal in the foregoing embodiments, and details are not described herein again to avoid repetition.

In the apparatus for transmitting signals according to embodiments of the present application, by grouping nodes and allocating corresponding configuration resource to each node group, a first signal is transmitted based on the configuration resources, the first signal carries the transmission resource for indicating each node to monitor and receive the second signal subsequently transmitted by the network side based on the transmission resource, which can reduce a problem of collision under multiple P-RNTI configurations, avoid ineffective paging monitoring by the node, and save power consumption of the nodes.

Figure 5:
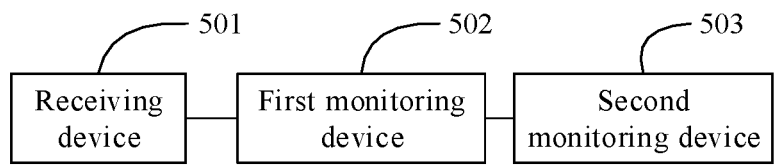
FIG. 5 is a schematic structural diagram of an apparatus for receiving signals according to an embodiment of the present application.

FIG. 5 is a schematic structural diagram of an apparatus for receiving signals according to an embodiment of the present application. As shown in FIG. 5, the apparatus includes a receiving device 501, a first monitoring device 502 and a second monitoring device 503, in which:
the receiving device 501, used to receive, based on a determined grouping number of node groups, one or more configuration resources of resource configuration information transmitted by a network side, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;
the first monitoring device 502, used to monitor a first signal based on a corresponding configuration resource, where the first signal is transmitted by the network side based on the resource configuration information; and
the second monitoring device 503, used to receive a second signal based on a transmission resource indicated by the first signal after the first signal is monitored, where the second signal is transmitted by the network side on the transmission resource indicated by the first signal.

In the apparatus for receiving signals according to embodiments of the present application, by grouping nodes and allocating corresponding configuration resource to each node group, a first signal is transmitted based on the configuration resource, the first signal carries the transmission resource for indicating each node to receive a second signal based on the transmission resource, which can reduce a problem of collision under multiple P-RNTI configurations, avoid ineffective paging monitoring by the node, and save power consumption of the nodes.

Figure 6:
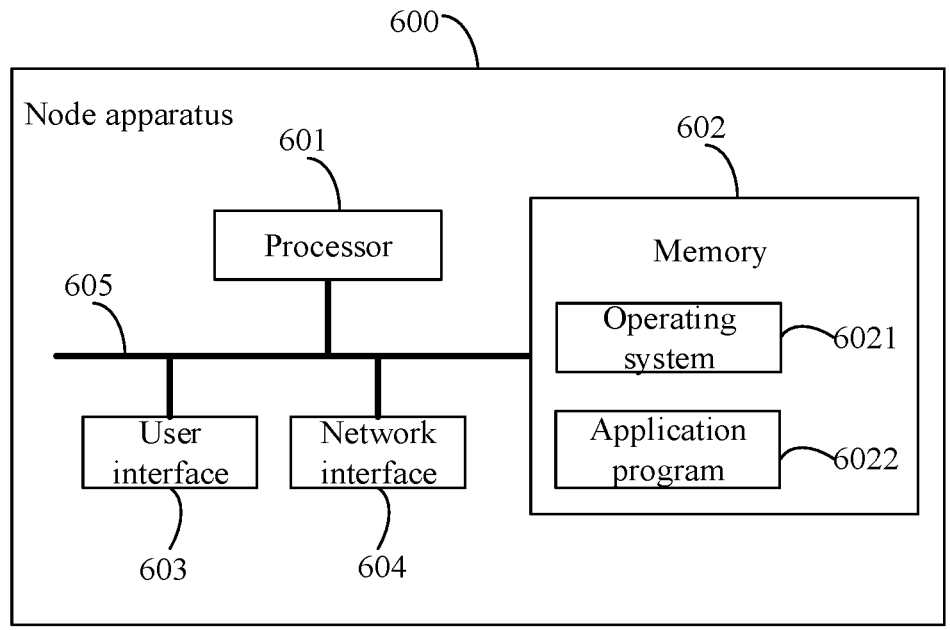
FIG. 6 is a schematic structural diagram of a node device according to an embodiment of the present application.

FIG. 6 is a schematic structural diagram of a node device according to an embodiment of the present application. As shown in FIG. 6, the node device 600 may include: at least one processor 601, a memory 602, at least one network interface 604 and another user interfaces 603. Respective components in the node device 600 are coupled together through the bus system 605. It should be noted that the bus system 605 is used to realize the connection and communication between these components. In addition to the data bus, the bus system 605 also includes a power bus, a control bus and a status signal bus. However, for clarity of illustration, the various buses are labeled as the bus system 605 in FIG. 6.

The user interface 603 may include a display, a keyboard or a pointing device, such as a mouse, a trackball, a touch pad or a touch screen, and the like.

It should be noted that the memory 602 in the embodiments of the present application may be a volatile memory or a non-volatile memory, or may include both volatile and non-volatile memory. The non-volatile memory may be read-only memory (ROM), programmable read-only memory (PROM), erasable programmable read-only memory (Erasable PROM, EPROM), electrically erasable programmable read-only memory (Electrically EPROM, EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 602 in the systems and methods described in various embodiments of the present application is intended to include, but not be limited to, these and any other suitable types of memory.

In some embodiments, memory 602 stores the following components: executable modules or data structures, or subsets thereof, or extended sets of them, such as operating system 6021 and application program 6022.

Herein, the operating system 6021 includes various system programs, such as a framework layer, a core library layer, a driver layer and the like, to implement various basic services and process hardware-based tasks. The application program 6022 includes various application programs, such as a media player, a browser and the like, to implement various application services. The program for implementing the methods according to the embodiments of the present application may be included in the application program 6022.

In an embodiment of the present application, by calling the computer program or instruction stored in the memory 602, for example, it can be the computer program or instruction stored in the application program 6022, the processor 601 is configured for:

receiving, based on a determined grouping number of node groups, one or more configuration resources of resource configuration information transmitted by a network side, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;

monitoring a first signal based on a corresponding configuration resource, where the first signal is transmitted by the network side based on the resource configuration information;

receiving a second signal based on a transmission resource indicated by the first signal after the first signal is monitored, where the second signal is transmitted by the network side on the transmission resource indicated by the first signal.

The methods disclosed in the above embodiments of the present application may be applied to the processor 601, or implemented by the processor 601. The processor 601 may be an integrated circuit chip with signal processing capability. In the implementation process, each step of the above methods may be completed by an integrated logic circuit of hardware in the processor 601 or an instruction in the form of software. The above processor 601 may be a general purpose processor, a digital signal processor (DSP), an application specific integrated circuit (ASIC), a field programmable gate array (FPGA) or other programmable logic devices, discrete gate or transistor logic devices, discrete hardware components. The methods, steps, and logic block diagrams disclosed in the embodiments of the present application may be implemented or executed by these ways. A general purpose processor may be a microprocessor or the processor may be any conventional processor and the like. The steps of the method disclosed in conjunction with the embodiments of the present application may be directly embodied as executed by a hardware decoding processor, or executed by a combination of hardware and software modules in the decoding processor. The software module can be located in random access memory, flash memory, read-only memory, programmable read-only memory or electrically erasable programmable memory, registers and other mature storage media in the art. The storage medium is located in the memory 602, and the processor 601 reads the information in the memory 602, and completes the steps of the above methods in combination with its hardware.

It should be noted that the embodiments described herein may be implemented in hardware, software, firmware, middleware, microcode, or a combination thereof. For hardware implementation, the processing unit may be implemented in one or more application specific integrated circuits (ASIC), digital signal processing (DSP), DSP device (DSPD), programmable logic device (PLD), field-programmable gate array (FPGA), general purpose processor, controller, microcontroller, microprocessor, other electronic unit for performing the functions described in this application or a combination thereof.

For software implementation, the described solutions can be implemented through modules (such as procedures, functions and the like) that perform the functions described in the embodiments of the present application. Software codes can be stored in memory and executed by a processor. The memory can be implemented in the processor or external to the processor.

As another embodiment, the first configuration resource includes a first parameter configuration in a first resource set, and the second configuration resource includes a second parameter configuration in the first resource set;

the monitoring the first signal based on the corresponding configuration resource, where the first signal is transmitted by the network side based on the resource configuration information, includes:

monitoring, by the first node group, the first signal based on the first parameter configuration, and monitoring, by the second node group, the first signal based on the second parameter configuration, or monitoring, by the second node group, the first signal based on a combination of the first parameter configuration and the second parameter configuration.

As another embodiment, the first configuration resource includes a third parameter configuration in a second resource set, and the second configuration resource includes a fourth parameter configuration in a third resource set; the first signal includes a third signal and/or a fourth signal.

The monitoring a first signal based on the corresponding configuration resource, includes:
  monitoring, by the first node group and/or the second node group, the third signal based on the third parameter configuration in the second resource set; and/or
  monitoring, by the second node group, the fourth signal based on the fourth parameter configuration in the third resource set.

As another embodiment, the second configuration resource further includes a fifth parameter configuration in the second resource set; and the method further includes:
  monitoring, by the second node group, the fourth signal based on the fifth parameter configuration.

As another embodiment, the second signal includes a fifth signal and/or a sixth signal, the receiving the second signal based on the transmission resource indicated by the first signal after the first signal is monitored, where the second signal is transmitted by the network side on the transmission resource indicated by the first signal, includes:
  receiving, by the first node group and/or the second node group, the fifth signal based on the transmission resource indicated by the third signal after the third signal is monitored; and/or
  receiving, by the second node group, the sixth signal based on the transmission resource indicated by the fourth signal after the fourth signal is monitored.

As another embodiment, each of the first configuration resource and the second configuration resource include at least one of: time-frequency resource configuration, aggregation level (AL), numbers of blind decoding, candidates, or search space configuration; where the search space configuration includes at least one of a search space period, a search space offset, or a symbol pattern for each physical downlink control channel (PDCCH) monitoring occasion.

As another embodiment, each of the first resource set, the second resource set and the third resource set includes at least one of: one or more slots, one or more symbols, one or more control resource sets (CORESET), one or more search spaces (SS), or one or more monitoring occasions (MO); and
  each of the first resource set, the second resource set and the third resource set is configured and/or received through at least one of predefining, broadcast messages, system messages, or radio resource control (RRC) signaling/messages.

As another embodiment, the search space of the first resource set or the search space of the second resource set includes a common search space.

The search space of the third resource set includes at least one of a common search space or a node-specific search space.

As another embodiment, any one or any combination of the following are included:
  each of the first configuration resource and the second configuration resource is configured with a corresponding monitoring priority to indicate whether to monitor and/or a monitoring order;
  one of the first configuration resource and the second configuration resource is configured with a monitoring priority to indicate whether to monitor and/or a monitoring order;
  each of the first node group and the second node group is configured with a corresponding monitoring priority to indicate whether to monitor and/or a monitoring order; or
  one of the first node group and the second node group is configured with a corresponding monitoring priority to indicate whether to monitor and/or a monitoring order.

In an embodiment, the method further includes:
  monitoring or sequentially monitoring, by first node group and the second node group, according to configured monitoring priorities.

As another embodiment, each of the first configuration resource and the second configuration resource is configured with the corresponding monitoring priority, which includes any one or any combination of:
  each of the first resource set, the second resource set and the third resource set is configured with a corresponding monitoring priority;
  one or more of the first resource set, the second resource set and the third resource set are configured with a monitoring priority to indicate whether to monitor and/or a monitoring order; where one or more of the first resource set, the second resource set and the third resource set may be one resource set among them or several resource sets among them, which is not limited here;
  each parameter configuration is configured with a corresponding monitoring priority; or
  one or more of the parameter configuration are configured with a monitoring priority to indicate whether to monitor and/or a monitoring order. One or more of the parameter configurations may be one parameter configuration or several parameter configurations, which is not limited here.

As another embodiment, the first node group and the second node group are grouped based on at least one of:
  grouping numbers configured by a network, network-predefined rules or information reported by nodes;
  where the grouping numbers are configured and/or received through at least one of predefining, broadcast messages, system messages, or radio resource control (RRC) signaling/messages.

The node device according to the embodiment of the present application may perform various processes implemented by the node device in the foregoing embodiments, and details are not described herein again to avoid repetition.

In the node device according to embodiments of the present application, by grouping nodes and allocating corresponding configuration resource to each node group, a first signal is transmitted based on the configuration resource, the first signal carries the transmission resource for indicating each node to receive the second signal based on the transmission resource, which can reduce a problem of collision under multiple P-RNTI configurations, avoid ineffective paging monitoring by the node, and save power consumption of the nodes.

Figure 7:
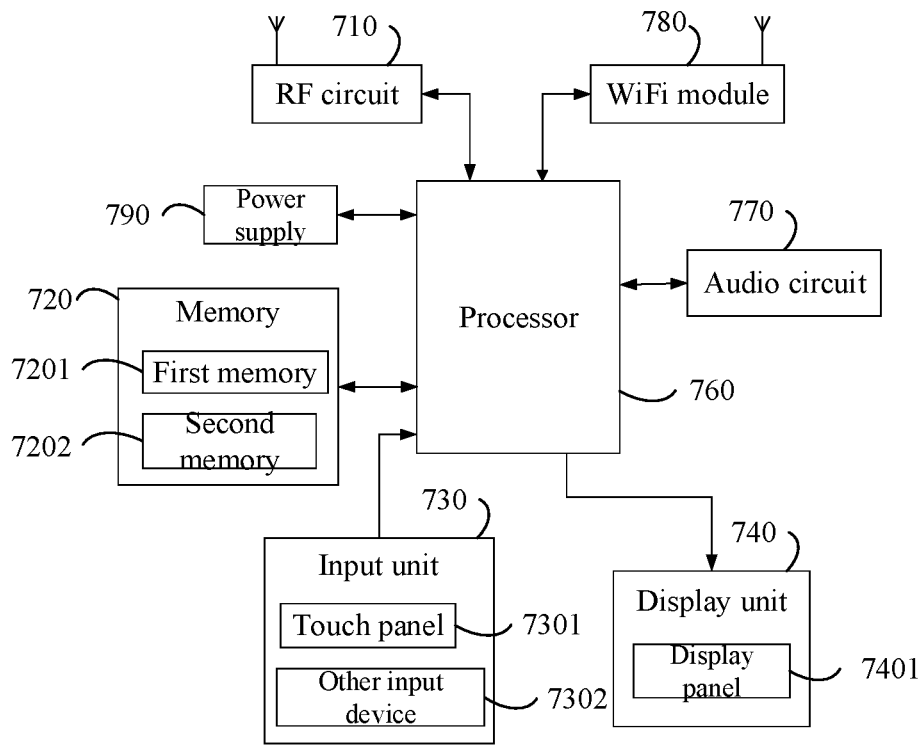
FIG. 7 is a schematic structural diagram of a node device according to another embodiment of the present application.

FIG. 7 is a schematic structural diagram of another node device according to an embodiment of the present application. The node device in FIG. 7 may be a mobile phone, a tablet computer, a personal digital assistant (PDA), or an electronic reader, a handheld game console, point of sales (POS), vehicle electronic devices (vehicle computers) and the like. As shown in FIG. 7, the node device includes a radio frequency (RF) circuit 710, a memory 720, an input unit 730, a display unit 740, a processor 760, an audio circuit 770, a wireless fidelity (WiFi) module 780 and a power supply 790. The structure of the node device shown in FIG. 7 does not constitute a limitation on the nodes, and may include more or less components than those shown in the figure, or combine some components, or separate some components, or have different component arrangements.

Herein, the input unit 730 can be used for receiving the numerical or character information input by the user, and generating the signal input related to the user setting and function control of the node device. Specifically, in present embodiment of the present application, the input unit 730 may include a touch panel 7301. The touch panel 7301 is also known as the touch screen, which can collect the user's touch operations on or near it (such as the user's operations on the touch panel 7301 using any suitable objects or accessories such as fingers, stylus and the like) and drives the corresponding connection devices according to preset programs. In one embodiment, the touch panel 7301 may include a touch detection device and a touch controller. The touch detection device is configured to detect the user's touch orientation, detect the signal brought by the touch operation, and transmit the signal to the touch controller; the touch controller is configured to receive the touch information from the touch detection device, convert it into contact coordinates, and then send it to the processor 760, and can receive the commands sent by the processor 760 and execute them. In addition, the touch panel 7301 can be implemented in various types such as resistive, capacitive, infrared, and surface acoustic waves. In addition to the touch panel 7301, the input unit 730 may also include other input devices 7302, which may be used to receive input numeric or character information, and generate key signal input related to user settings and function control of the node device. In one embodiment, other input devices 7302 may include, but not limited to, one or more of physical keyboards, function keys (such as volume control keys, switch keys and the like), trackballs, mice, joysticks, optical mice (optical mice is touch-sensitive mice that do not display visual output surface, or an extension of a touch-sensitive surface formed by a touch screen) and the like.

Herein, the display unit 740 may be used to display information input by the user or information provided to the user and various menu interfaces of the node device. The display unit 740 may include a display panel 7401. The display panel 7401 can be configured in the form of a liquid crystal display (LCD), an organic light-emitting diode (OLED) and the like.

It should be noted that the touch panel 7301 can cover the display panel 7401 to form a touch display screen. When the touch display screen detects a touch operation on or near it, the touch operation is transmitted to the processor 760 to determine the type of touch event, and then the processor 760 provides corresponding visual output on the touch display screen according to the type of touch event.

The touch screen includes the application program interface display area and the common control display area. The arrangement of the application program interface display area and the common control display area is not limited, and may be an arrangement that can distinguish the two display areas, such as up-down arrangement, left-right arrangement and the like. The application program interface display area can be used to display the interface of the application program. Each interface may contain at least one application icon and/or interface components such as widget desktop controls. The application program interface display area can also be an empty interface that does not contain any content. The common control display area is used to display controls with high usage rate, such as setting buttons, interface numbers, scroll bars, phonebook icons and other application icons.

The RF circuit 710 can be used for receiving and sending signals during sending and receiving information or during a call. In particular, after being received from the network side, the downlink information is processed by the processor 760. In addition, the related uplink data is sent to the network side. Typically, the RF circuit 710 includes, but not limited to, an antenna, at least one amplifier, a transceiver, a coupler, a low noise amplifier (LNA), a duplexer and the like. In addition, RF circuitry 710 may also communicate with networks and other devices via wireless communications. The wireless communication can use any communication standard or protocol, including but not limited to global system of mobile communication (GSM), general packet radio service (GPRS), code division multiple access (CDMA), wideband code division multiple access (WCDMA), long term evolution (LTE), email, short messaging service (SMS) and the like.

The memory 720 is used to store software programs and modules, and the processor 760 executes various functional applications and data processing of the node device by running the software programs and modules stored in the memory 720. The memory 720 may mainly include a stored program area and a stored data area, where the stored program area may store an operating system, an application program required for at least one function (such as a sound playback function, an image playback function, etc.) and the like; the stored data area may store the data (such as audio data, phone book and the like) created according to the usage of the node device and the like. Additionally, the memory 720 may include high-speed random access memory, and may also include non-volatile memory, such as at least one magnetic disk storage device, a flash memory device, or other volatile solid state storage device.

Herein the processor 760 is the control center of the node device, using various interfaces and lines to connect various parts of the entire node device, running or executing the software programs and/or modules stored in a first memory 7201, and calling the data stored in a second memory 7202, to perform various functions of the node device and process data, to monitor the node device as a whole. In one embodiment, the processor 760 may include one or more processing units.

In present embodiment of the present application, by calling the software programs and/or modules stored in the first memory 7201 and/or data stored in the second memory 7202, the processor 760 is configured for:

receiving, based on a determined grouping number of node groups, one or more configuration resources of resource configuration information transmitted by a network side, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;

monitoring a first signal based on a corresponding configuration resource, where the first signal is transmitted by the network side based on the resource configuration information;

receiving a second signal based on a transmission resource indicated by the first signal after the first signal is monitored, where the second signal is transmitted by the network side on the transmission resource indicated by the first signal.

The node device according to the embodiment of the present application may perform various processes implemented by the node device in the foregoing embodiments, and details are not described herein again to avoid repetition.

The solutions according to the embodiments of the present application have been described from the perspective of electronic devices. It should be noted that, in order to provide the above-mentioned functions, the electronic device provided by the embodiments of the present application includes corresponding hardware structures and/or software modules for executing each function. The present application can be implemented in hardware or a combination of hardware and computer software with the units and algorithm steps of each example described in conjunction with the embodiments disclosed in the present application.

Whether a function is executed by a computer software or driving hardware depends on the specific application and design constraint conditions of the embodiments. Professionals and technicians can use different methods for each specific application to implement the described functions, but such implementation should not be considered beyond the scope of the present application.

In the embodiments of the present application, functional modules can be divided into electronic devices and the like according to the foregoing method examples. For example, each functional module can be divided corresponding to each function, or two or more functions can be integrated into a processing device. The above-mentioned integrated unit can be implemented in the form of hardware or software functional unit.

It should be noted that, the division of modules in the embodiments of the present application is schematic, and is only a logical function division, and there may be other division manners in actual implementation.

For the convenience and conciseness of the description, only the division of the above-mentioned functional modules is used for illustration. In practical applications, the above-mentioned functions can be assigned to different functional modules as required. The internal structure of the device may be divided into different functional modules to complete all or part of the functions described above. For the specific working process of the system, apparatus and device described above, reference may be made to the corresponding process in the foregoing method embodiments, and details are not described herein again.

In the several embodiments according to the present application, it should be noted that the disclosed device and method may be implemented in other manners. For example, the device embodiments described above are only illustrative. For example, the division of the modules or units/devices is only a logical function division and there may be other division methods in actual implementation. For example, multiple units or elements may be combined or integrated into another system, or some features may be omitted, or not implemented. On the other hand, the shown or discussed mutual coupling or direct coupling or communication connection may be indirect coupling or communication connection of devices or units through some interfaces.

The units described as separate components may or may not be physically separate, and the components displayed as units may or may not be physical units, that is, may be located at the same place, or it can be distributed to multiple network units. Some or all of the units may be selected according to actual needs to achieve the purpose of the solution of the present embodiment.

In addition, the functional units in the various embodiments of the present application may be integrated into one processing unit, or each unit may exist alone physically, or two or more units may be integrated into one unit. The above-mentioned integrated units may be implemented in the form of software functional units.

If the integrated unit is implemented in the form of a software functional unit and sold or used as an independent product, it can be stored in a computer readable storage medium. Based on such understanding, a part of or all the solutions may be embodied in the form of a software product, which is stored in a storage medium, including several instructions to cause a computer device (which may be a personal computer, server, or network device, etc.) to perform all or part of the steps of the methods described in the respective embodiments of the present application. The computer storage medium is a non-transitory medium, including: flash memory, removable hard disk, read-only memory, random access memory, magnetic disk or optical disk and other mediums that can store program codes.

The present application provides a non-transitory computer-readable storage medium having stored thereon computer programs, when executed by the processor, the computer programs are configured to implement the steps of the method mentioned above according to the embodiments, including:

transmitting resource configuration information, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;

generating a first signal and transmitting the first signal based on the resource configuration information for the first node group and the second node group monitoring the first signal based on respective configuration resources, and generating a second signal and transmitting the second signal on a transmission resource indicated by the first signal for the first node group and the second node group receiving the second signal based on the transmission resource indicated by the first signal after the first signal is monitored.

The present application provides a non-transitory computer-readable storage medium having stored thereon computer programs, when executed by the processor, the computer programs are configured to implement the steps of the method mentioned above according to the embodiments, including:

receiving, based on a determined grouping number of node groups, one or more configuration resources of resource configuration information transmitted by a network side, where the resource configuration information includes a first configuration resource and a second configuration resource, the first configuration resource is a configuration resource configured for a first node group, and a combination of the first configuration resource and the second configuration resource or the second configuration resource is a configuration resource configured for a second node group;

monitoring a first signal based on a corresponding configuration resource, where the first signal is transmitted by the network side based on the resource configuration information;

receiving a second signal based on a transmission resource indicated by the first signal after the first signal is monitored, where the second signal is transmitted by the network side on the transmission resource indicated by the first signal.

What is claimed is:

1. A method for transmitting signals, performed by a network side, and the method comprising:
transmitting resource configuration information, wherein the resource configuration information comprises a first configuration resource and a second configuration resource, and the first configuration resource is a configuration resource configured for a first node group, wherein a combination of the first configuration resource and the second configuration resource is a configuration resource configured for a second node group;
transmitting a first signal based on the resource configuration information to enable nodes in the first node group and the second node group to monitor the first signal based on respective configuration resources, and
transmitting a second signal on a transmission resource indicated by the first signal to enable the nodes in the first node group and the second node group to receive the second signal based on the transmission resource indicated by the first signal after the first signal is monitored.

2. The method of claim 1, wherein the first configuration resource comprises a first parameter configuration in a first resource set, and the second configuration resource comprises a second parameter configuration in the first resource set;
the generating a first signal and transmitting the first signal based on the resource configuration information to enable the first node group and the second node group to monitor the first signal based on respective configuration resources comprises:
generating and transmitting the first signal, wherein the first signal is transmitted based on the first resource set for the first node group monitoring the first signal based on the first parameter configuration, and for the second node group monitoring the first signal based on the second parameter configuration or for the second node group monitoring the first signal based on a combination of the first parameter configuration and the second parameter configuration, and the first resource set is the resource configuration information.

3. The method of claim 2, wherein a search space of the first resource set comprises a common search space.

4. The method of claim 1, wherein the first configuration resource comprises a third parameter configuration in a second resource set, and the second configuration resource comprises a fourth parameter configuration in a third resource set, and the first signal comprises a third signal and/or a fourth signal, and
the generating a first signal and transmitting the first signal based on the resource configuration information to enable nodes in the first node group and the second node group to monitor the first signal based on respective configuration resources comprises:
generating and transmitting the third signal, wherein the third signal is transmitted based on the third parameter configuration in the second resource set to enable the first node group and/or the second node group to monitoring the third signal based on the third parameter configuration, wherein the third parameter configuration in the second resource set is the resource configuration information; and/or
generating and transmitting the fourth signal, wherein the fourth signal is transmitted based on the fourth parameter configuration in the third resource set to enable the second node group to monitor the fourth signal based on the fourth parameter configuration, wherein the fourth parameter configuration in the third resource set is the resource configuration information.

5. The method of claim 4, wherein the second configuration resource further comprises a fifth parameter configuration in the second resource set, and the method further comprises:
transmitting the fourth signal based on the fifth parameter configuration in the second resource set to enable the second node group to monitor the fourth signal based on the fifth parameter configuration, wherein the fifth parameter configuration in the second resource set is the resource configuration information.

6. The method of claim 4, wherein the second signal comprises a fifth signal and/or a sixth signal, and the generating a second signal and transmitting the second signal on a transmission resource indicated by the first signal to enable the first node group and the second node group to receive the second signal based on the transmission resource indicated by the first signal after the first signal is monitored comprises:
generating and transmitting the fifth signal, wherein the fifth signal is transmitted on a transmission resource indicated by the third signal to enable the first node group and/or the second node group to receive the fifth signal based on the transmission resource indicated by the third signal after the third signal is monitored; and/or
generating and transmitting the sixth signal, wherein the sixth signal is transmitted on a transmission resource indicated by the fourth signal to enable the second node group to receive the sixth signal based on the transmission resource indicated by the fourth signal after the fourth signal is monitored.

7. The method of claim 4, wherein a search space of the second resource set comprises a common search space; and
a search space of the third resource set comprises at least one of a common search space or a node-specific search space.

8. The method of claim 1, comprising at least one of the following items:
each of the first configuration resource and the second configuration resource is configured with a corresponding monitoring priority to indicate whether to monitor and/or a monitoring order;
one of the first configuration resource and the second configuration resource is configured with a monitoring priority to indicate whether to monitor and/or a monitoring order;
each of the first node group and the second node group is configured with a corresponding monitoring priority to indicate whether to monitor and/or a monitoring order; or
one of the first node group and the second node group is configured with a corresponding monitoring priority to indicate whether to monitor and/or a monitoring order;
wherein each of the first configuration resource and the second configuration resource being configured with the corresponding monitoring priority, comprises any one or any combination of:
each resource set being configured with a corresponding monitoring priority, one or more of all resource sets being configured with a monitoring priority to indicate whether to monitor and/or a monitoring order, each parameter configuration being configured with a corresponding monitoring priority, or one or more of the parameter configuration being configured with a monitoring priority to indicate whether to monitor and/or a monitoring order.

9. The method of claim 1, wherein the first node group and the second node group are grouped based on at least one of:

grouping numbers configured by a network, network-predefined rules or information reported by nodes, wherein the grouping numbers are configured and/or transmitted through at least one of predefining, broadcast messages, system messages, or radio resource control (RRC) signaling/messages.

10. A method for receiving signals, performed by a node in a first node group and/or a node in a second node group, and the method comprising:

receiving, based on a determined grouping number of a node group, one or more configuration resources of resource configuration information transmitted by a network side, wherein the resource configuration information comprises a first configuration resource and a second configuration resource, and the first configuration resource is a configuration resource configured for the first node group, wherein a combination of the first configuration resource and the second configuration resource is a configuration resource configured for the second node group;

monitoring a first signal based on respective configuration resources of nodes in the first node group and the second node group, wherein the first signal is transmitted by the network side based on the resource configuration information; and receiving a second signal based on a transmission resource indicated by the first signal after the first signal is monitored, wherein the second signal is transmitted by the network side on the transmission resource indicated by the first signal.

11. The method of claim 10, wherein the first configuration resource comprises a first parameter configuration in a first resource set, and the second configuration resource comprises a second parameter configuration in the first resource set;

the monitoring the first signal based on the corresponding configuration resource, wherein the first signal is transmitted by the network side based on the resource configuration information, comprises:

monitoring, by the first node group, the first signal based on the first parameter configuration, and monitoring, by the second node group, the first signal based on the second parameter configuration, or monitoring, by the second node group, the first signal based on a combination of the first parameter configuration and the second parameter configuration.

12. The method of claim 10, wherein the first configuration resource comprises a third parameter configuration in a second resource set, the second configuration resource comprises a fourth parameter configuration in a third resource set, and the first signal comprises a third signal and/or a fourth signal;

the monitoring the first signal based on the corresponding configuration resource, comprises:

monitoring, by the first node group and/or the second node group, the third signal based on the third parameter configuration in the second resource set; and/or monitoring, by the second node group, the fourth signal based on the fourth parameter configuration in the third resource set.

13. The method of claim 12, wherein the second configuration resource further comprises a fifth parameter configuration in the second resource set, and the method further comprises:

monitoring, by the second node group, the fourth signal based on the fifth parameter configuration.

14. The method of claim 12, wherein the second signal comprises a fifth signal and/or a sixth signal, the receiving the second signal based on the transmission resource indicated by the first signal after the first signal is monitored, wherein the second signal is transmitted by the network side on the transmission resource indicated by the first signal, comprises:

receiving, by the first node group and/or the second node group, the fifth signal based on a transmission resource indicated by the third signal after the third signal is monitored; and/or receiving, by the second node group, the sixth signal based on a transmission resource indicated by the fourth signal after the fourth signal is monitored.

15. The method of claim 11, wherein a search space of the first resource set comprises a common search space.

16. The method of claim 12, wherein a search space of the second resource set comprises a common search space; and a search space of the third resource set comprises at least one of a common search space or a node-specific search space.

17. The method of claim 10, comprising at least one of the following items:

each of the first configuration resource and the second configuration resource is configured with a corresponding monitoring priority to indicate whether to monitor and/or a monitoring order;

one of the first configuration resource and the second configuration resource is configured with a monitoring priority to indicate whether to monitor and/or a monitoring order;

each of the first node group and the second node group is configured with a corresponding monitoring priority to indicate whether to monitor and/or a monitoring order; or one of the first node group and the second node group is configured with a corresponding monitoring priority to indicate whether to monitor and/or a monitoring order;

wherein the method further comprises:

monitoring or sequentially monitoring, by first node group and the second node group, according to configured monitoring priorities;

wherein each of the first configuration resource and the second configuration resource is configured with the corresponding monitoring priority, which comprises any one or any combination of:

each resource set being configured with a corresponding monitoring priority;

one or more of all resource sets being configured with a monitoring priority to indicate whether to monitor and/or a monitoring order;

each parameter configuration being configured with a corresponding monitoring priority; or one or more of the parameter configuration being configured with a monitoring priority to indicate whether to monitor and/or a monitoring order.

18. The method of claim 10, wherein the first node group and the second node group are grouped based on at least one of:
grouping numbers configured by a network, network-predefined rules or information reported by nodes;
wherein the grouping numbers are configured and/or received through at least one of predefining, broadcast messages, system messages, or radio resource control (RRC) signaling/messages.

19. A network side apparatus, comprising a processor and a memory storing a program that is executable on the processor, wherein the program, when executed by the processor, causes the processor to perform the following steps:
transmitting resource configuration information, wherein the resource configuration information comprises a first configuration resource and a second configuration resource, and the first configuration resource is a configuration resource configured for a first node group, wherein a combination of the first configuration resource and the second configuration resource is a configuration resource configured for a second node group;
transmitting a first signal based on the resource configuration information to enable nodes in the first node group and the second node group to monitor the first signal based on respective configuration resources, and
transmitting a second signal on a transmission resource indicated by the first signal to enable the nodes in the first node group and the second node group to receive the second signal based on the transmission resource indicated by the first signal after the first signal is monitored.

20. A node apparatus, comprising a processor and a memory storing a program that is executable on the processor, the program, when executed by the processor, causes the processor to perform the steps of claim 10.

* * * * *